United States Patent
Koopman et al.

(10) Patent No.: US 10,671,692 B2
(45) Date of Patent: Jun. 2, 2020

(54) UNIQUELY IDENTIFYING AND TRACKING SELECTABLE WEB PAGE OBJECTS

(71) Applicant: Adobe Inc., San Jose, CA (US)

(72) Inventors: Mark R. Koopman, San Diego, CA (US); Guillaume L. Escarguel, San Diego, CA (US)

(73) Assignee: Adobe Inc., San Jose, CA (US)

( * ) Notice: Subject to any disclaimer, the term of this patent is extended or adjusted under 35 U.S.C. 154(b) by 440 days.

(21) Appl. No.: 15/235,535

(22) Filed: Aug. 12, 2016

(65) Prior Publication Data

US 2018/0046637 A1    Feb. 15, 2018

(51) Int. Cl.
  *G06F 3/048* (2013.01)
  *G06F 16/958* (2019.01)
  *H04L 29/08* (2006.01)
  *G06F 16/955* (2019.01)

(52) U.S. Cl.
  CPC .......... *G06F 16/958* (2019.01); *G06F 3/048* (2013.01); *G06F 16/9558* (2019.01); *H04L 67/22* (2013.01)

(58) Field of Classification Search
  CPC .................. G06F 3/048; G06F 16/958
  See application file for complete search history.

(56) References Cited

U.S. PATENT DOCUMENTS

| | | | | |
|---|---|---|---|---|
| 2007/0276921 A1* | 11/2007 | Riggs | ............... | G06F 17/30876 709/217 |
| 2012/0011429 A1* | 1/2012 | Kosaka | ............ | G06F 17/30882 715/230 |
| 2014/0304389 A1* | 10/2014 | Reavis | ................... | G06Q 30/02 709/224 |
| 2015/0046436 A1* | 2/2015 | Li | ........................ | G06F 17/3053 707/723 |
| 2015/0356102 A1* | 12/2015 | Cohen | ................. | G06F 17/3089 707/722 |
| 2016/0316176 A1* | 10/2016 | Laska | ................. | G06K 9/00711 |
| 2017/0235436 A1* | 8/2017 | Hooton | ................. | G06F 3/0482 705/7.11 |

OTHER PUBLICATIONS

"What's making your visitors leave?", https://web.archive.org/web/20160729044652/https://www.crazyegg.com, Jul. 29, 2016.

* cited by examiner

*Primary Examiner* — Xuyang Xia
(74) *Attorney, Agent, or Firm* — Kilpatrick Townsend & Stockton LLP

(57) ABSTRACT

Embodiments are provided for uniquely identifying and tracking selectable web page objects and presenting tracked activity for the selectable objects. In some cases, an analytics tool is used to collect and present link activity based on analytics data for a given selectable object of a content page, such as a clickable link or image. For example, a method analyzes a content page comprising a plurality of selectable objects and determines, based on the analyzing, a page identifier for the content page, and region identifiers for regions within the content page. The method generates, for each of the selectable objects, a unique object identifier comprising the page identifier, a region identifier corresponding to a region of the page where the object is located, and a link identifier. Link activity corresponding to the selectable objects is tracked and displayed, the link activity being based on measured analytics data over periods of time.

20 Claims, 13 Drawing Sheets

UNIQUELY IDENTIFYING AND TRACKING SELECTABLE WEB PAGE OBJECTS

TECHNICAL FIELD

This disclosure relates generally to computer-implemented methods and systems and more particularly relates to automatically and uniquely identifying selectable (e.g., clickable) objects in a web page that ensures consistency of identity across browsing platforms.

BACKGROUND

The collection of analytics data such as web navigation and web page interaction data to analyze how users engage with interactive online content is a common practice in the field of data analytics. In this field, analysts are often faced with the task of identifying which objects in a web page have been selected or clicked by a user. Providing analysts with tools to uniquely identify selectable objects within the context of a content page for which analytics data have been measured and collected can be extremely valuable. Tools exist to track the screen coordinates (i.e., X Y coordinates) of a mouse click event in a given browser or browsing platform. However, these existing tools lack the ability to automatically and uniquely identify and track selectable objects in a web page across various browsers and browsing platforms. This is because existing tools use numeric representations of link locations within a web page that are inconsistent across different browsing platforms and across different makes of browsers running on the same platform.

SUMMARY

According to certain embodiments, systems and methods are provided for uniquely identifying selectable objects in content pages so that user interactions with these objects can be tracked. For example, in embodiments where the selectable object is a link in a dynamic web page, a link identifier is created in order to track link click events for the link. The systems and methods uniquely identify selectable objects, such as, for example, clickable links, in dynamic web pages that are rendered differently depending on the profile of the user visiting the page. Despite this highly dynamic web page environment, embodiments uniquely and consistently identify a link within a web page. In certain embodiments, this identification is consistent across multiple browser makes, and is also consistent across different computing platforms running the browsers (e.g., different operating systems and computing devices). Example embodiments use an object identifier that is easily recognizable by an analyst so that it can be harnessed as an analytics dimension even when taken out of the context of the web page in which the selectable object appears.

In some embodiments, a region module or function of an analytics tool determines a region identifier corresponding to a region of a content page where a selectable object is located and a link module or function of the analytics tool determines a link identifier for the selectable object. According to these embodiments, the analytics tool identifies an object identifier for the selectable object that includes page identifier corresponding to the content page, the region identifier, and the link identifier, where the object identifier consistently identifies the selectable object regardless of a type of browser used to access the content page and regardless of a type of computing platform (e.g., a computing device or operating system) used to interact with the selectable object.

Example methods and systems use an analytics tool to uniquely identify and track selectable web page objects, and present tracked activity for the selectable web page objects. In some embodiments, the analytics tool is used to collect and present link activity based on analytics data for a given selectable object of a content page, such as a clickable link or image. In one example, a system tracks user interactions with selectable objects in a content page having one or more regions. The system receives tracked user interactions with the selectable objects, each of the selectable objects having a unique object identifier comprising a page identifier, a region identifier corresponding to a region of the content page where the selectable object is located, and a link identifier. In an example, the system includes an analytics tool with a region module that determines region identifiers for the selectable objects and a link tool that determines the link identifiers. The system aggregates and stores link activity for the plurality of selectable objects, the link activity including measured analytics data corresponding to the tracked user interactions over one or more periods of time. The system displays, for respective ones of the plurality of selectable objects, a presentation of the link activity based on one or more portions of the link activity corresponding to the selectable object. In one example, the system includes an activity map module that is configured to display the presentation of link activity.

In another example, a method analyzes a content page comprising a plurality of selectable objects and determines, based on the analyzing, a page identifier for the content page, and region identifiers for one or more regions within the content page. The method then generates, for each of the plurality of selectable objects, a unique object identifier comprising the page identifier, a region identifier corresponding to a region of the one or more regions where the selectable object is located, and a link identifier. Next, link activity corresponding to the plurality of selectable objects is retrieved. The link activity is based on measured analytics data over one or more periods of time. Then, for each of the plurality of selectable objects, a presentation of the link activity based on one or more portions of the link activity corresponding to the selectable object is displayed within a user interface.

Within a user interface of an analytics tool, object identifiers are used to display, for example, user activity information for a content page composed of a variety of selectable objects such as links with text and/or images, where analytics data for the selectable objects may be measured and collected. In some embodiments, the object identifiers are used to generate analytics data with link activity, where the link activity is with respect to one or more periods of time. Given the link activity, the analytics tool may display, within the user interface and within context of the content page, activity information based on one or more portions of the link activity corresponding to a given selectable object of the content page. Further, this display of link activity may be repeated for each of the selectable objects over a user-selected time period. In this way, a user such as an analyst may see trending information corresponding to a respective link or selectable object of a content page within context of the displayed content page.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
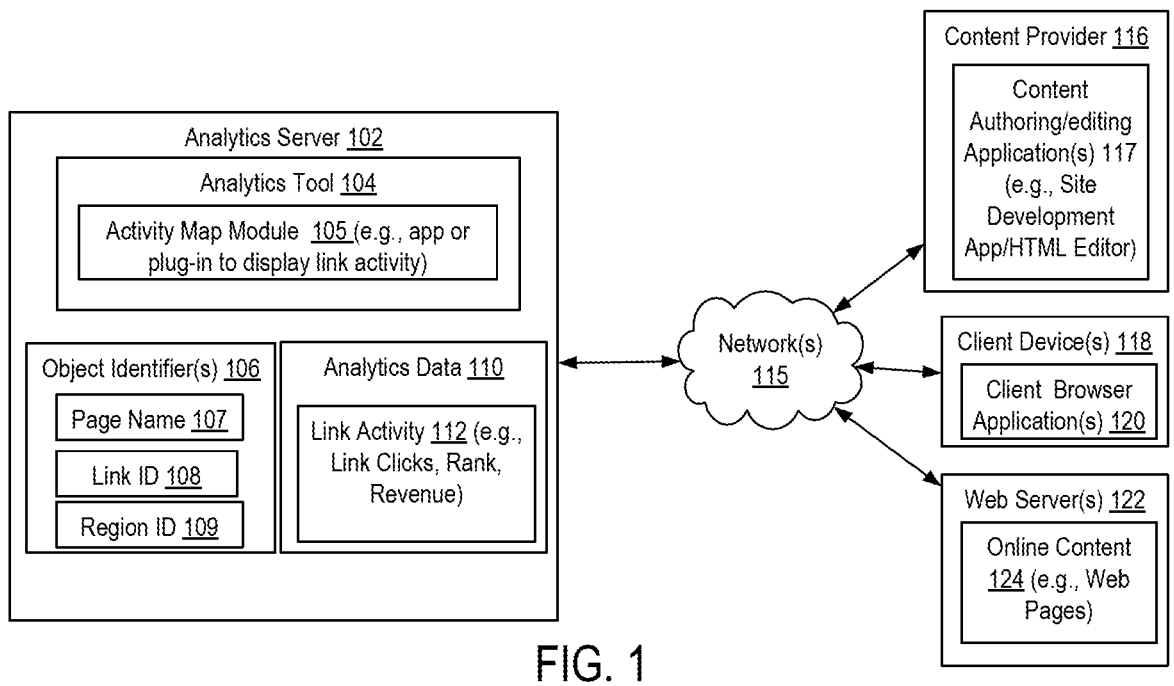
FIG. 1 is a block diagram depicting an example of a system that executes an application for identifying and tracking clickable objects in a content page, according to certain exemplary embodiments.

As discussed above, prior techniques do not automatically and uniquely identify and track selectable objects in a web page across various browsers and browsing platforms. Improved systems and techniques are disclosed for automatically identifying and tracking selectable objects in a web page, or more generally any content page. In certain embodiments, the selectable objects are clickable HTML objects in a web page that are seen by any person using a standard web browser to display the web page. The tracking of the selectable objects allows an analytics tool to further display, within the context of the web page, analytics data describing trending information for the selectable objects (e.g., clickable links or images) within the web page. The analytics tool can include an activity map module for displaying analytics data that is sorted by or references object identifiers for the selectable objects. The object identifiers uniquely and consistently identify selectable objects in dynamic content pages that are rendered differently depending on a type of browser, browsing platform (e.g., smart phone, laptop, or desktop computing device), or a user profile of a user visiting the pages. For example, the object identifier for a selectable object in a given region of a content page will remain the same despite changes in screen coordinates where that object is displayed in a given browser or browsing platform. Despite this highly dynamic web page environment, embodiments uniquely and consistently identify a link within a web page. In certain embodiments, this identification is consistent across multiple browser makes, and is also consistent across different computing platforms running the browsers (e.g., different operating systems and computing devices). Example embodiments use an object identifier that is easily recognizable by an analyst so that it can be harnessed as an analytics dimension even when taken out of the context of the web page in which the selectable object appears.

In contrast to existing techniques, certain embodiments ensure uniqueness of identifiers for selectable objects by generating separate identifiers (e.g., unique link IDs) for distinct selectable objects (e.g., clickable links) in a content page so that the selectable objects are not being tracked under the same identifier. These embodiments ensure consistency so that when an object is selected or clicked in any of a variety of browsers running on a variety of platforms or operating systems, user selection of the same object results in the same object identifier (e.g., the same link ID) being collected. For example, when a given object is selected or clicked on within a browser running on a tablet device, a smartphone, or a desktop computing device, selection of that same object will result in collection of the same object, regardless of the device, browser, or operating system where the selection occurred. After generating a unique object identifier for a selectable object, embodiments maintain that object identifier despite minor repositioning of the object within a content page. For example, minor repositioning of selectable objects such as links can occur as a result of responsive designs that use Ajax (Asynchronous JavaScript and XML)-based layouts. For instance, a link with a given link ID may change position slightly within a content page, but as long as the link stays within the same region of the page (e.g., a main, header, or footer region), this link will keep its same link ID. Embodiments generate object identifiers that are easily readable. For example, the object identifiers can be readily understood by a user of an analytics tools and used to easily identify a selectable object within the context of a link activity report provided by an analytics tool. In certain non-limiting embodiments, the link activity report can be an Activity Map report provided by an Adobe® Analytics web analytics tool. Example link activity reports are provided in FIGS. 6-9.

The following examples are provided to help introduce the general subject matter of certain embodiments. Object identifiers for selectable objects in a content page are generated in order to provide options for displaying activity information associated with selections of particular objects. The activity information can include click activity for links, images, or for other objects displayed in dynamic web pages of a web site. The object identifiers facilitate more efficient collection and analysis of data analytics metrics with regard to a given content page. For example, in addition to providing selection activity information for a given link, embodiments generate and use object identifiers to provide activity information for a content site as a whole, regardless of whether the objects are displayed in multiple regions, pages, or versions of the web site.

In accordance with some embodiments, object identifiers are generated for clickable HTML objects on a web page using three distinct parameters: (1) a webpage identifier identifying the content page where the object is located; (2) a link identifier identifying an HTML object being clicked; and (3) a region identifier identifying a defined HTML region of the web page where the object was clicked. The Region identifier allows the systems and methods disclosed herein to differentiate objects that have the same link identifiers but are present in different areas of the same content page. For example, web page footer may repeat some of the same links that are present in a web page header.

In accordance with certain embodiments, a server system or other processing system generates object identifiers and their parameters as follows. The link identifier is generated using a JavaScript function s.ActivityMap.link( ) that takes an HTML element as an input and outputs a string identifier for that link. The region identifier is generated using a JavaScript function s.ActivityMap.region( ) that takes an HTML element as an input and outputs a string identifier for that region of the content page. The web page identifier can be a page name parameter automatically generated from the content page's Uniform Resource Locator (URL), or in an alternative embodiment, web page identifier can be specified through a JavaScript variable. By generating these three parameters for an object identifier, embodiments can uniquely identify an HTML clickable object on a web page.

According to some embodiments, object identifiers are automatically generated and include a link identifier (link ID) and region identifier (region ID) for any links, on any web page such that each object is uniquely identified. These embodiments enable analysts, advertisers, and content providers to easily deploy link tracking across all of their web pages without having to manually define a link ID and region ID for every single selectable object on their web site. In accordance with these embodiments, two functions (s.ActivityMap.link( ) and s.ActivityMap.region( )) each have each a default implementation that ensures uniqueness for a clicked HTML element. In an embodiment, a page name parameter is combined together with the link ID and region ID parameters to generate a unique object identifier that consistently identifies a selectable object (e.g., a clickable link) in a content page no matter how dynamic the content page may be, or no matter on what platform (e.g., operating system or device) or browser is used to access the page.

In some embodiments, a web analytics tool, such as, for example, Adobe® Analytics, offers a page tag code or module, called AppMeasurement, which includes an Activity Map module. According to these embodiments, the Activity Map module is injected into a content page (e.g., a content provider's web page) so that the content provider can collect data when a web user clicks on links on that provider's web pages. The Activity Map module includes two functions, s.ActivityMap.link( ) and s.ActivityMap.region( ). These two functions define what is collected at the time of a user clicking on a link in a web page. The purpose of each function is to take an HTML element as input and to output a short string value that summarizes what link (or content page region) was clicked.

According to certain embodiments, a default implementation of the Activity Map module includes link and region functions, but an end-user of the analytics tool (e.g., an analyst user) is provided with a user interface to give the user the ability to define links and regions however they wish to better meet their needs. For example, a user can define 'what is a link' and 'what is a region' to suit their organization's needs. For instance, a given business or organization can choose to define a link as any selectable HTML object, image, or text link present in a web page. Customization of these link and region functions is supported by the Activity Map module. An example system including an Activity Map module is described below with reference to FIG. 1.

The Activity Map module can be implemented as an application or a plugin that displays clicks (and other metrics) as overlays on content pages. Examples of such overlays are depicted in FIGS. 8 and 10-12, which are discussed below. After pulling the collected links and regions from an analytics tool for a visited page, the Activity Map module matches the collected data to the link and region present in the visited page. In an embodiment, to extract the link ID and region ID, Activity Map uses the functions: s.ActivityMap.link( ) and s.ActivityMap.region( ). In this way, this embodiment ensures that the Activity Map application will use the same link ID and region ID for a link, as the IDs that are collected by the AppMeasurement module.

In accordance with embodiments, both the s.ActivityMap.link( ) and s.ActivityMap.region( ) functions are provided with a default implementation as described below. A default implementation of the s.ActivityMap.link( ) function is described with reference to the algorithm provided in the following paragraphs.

Example Link Module

According to an embodiment, a link module can be invoked by an analytics tool to determine link identifiers (i.e., link IDs) for selectable elements in a content page. For example, the link module can be embodied as a default s.ActivityMap.link( ) function that takes an HTML element, referred to as 'ele', as input and returns an output string value if a meaningful value can be found. If no value is found, there is no link found and the analytics tool does not collect anything upon the user clicking this HTML element. The steps that the s.ActivityMap.link( ) link function takes to extract a link ID from the "ele" HTML element are as follows:

1. a) If an 's_objectID' variable is set: if a value for a variable named s_objectID is set when clicking on "ele," then return the string value of s_objectID as the ID of the link. For example, the example HTML code below defines an onclick handler on an element, that when clicked sets s_objectID:

<a onclick="s_objectID='Link to news story'," href="breaking-news.html">Latest Updates On Breaking News</a>

In the above non-limiting example case, s_objectID is set to the value 'Link to news story'. S_ObjectID allows users to fully customize their web pages.

1. b) else if the HTML element (or children) has an innerText defined: if s_ObjectID is not found, the link function will then attempt to retrieve textual children of the "ele" clicked. In the HTML example code below, there is one child of the link clicked and it is a textual node with content 'Latest Updates On Breaking News.' While the code examples that follow are HTML, it is to be understood that in alternative embodiments, other markup languages and programming languages can be used. For example, embodiments of the link function can analyze a variety of online content, including XML documents, JavaScript, and Cascading Style Sheets (CSS), and the function is not limited to analyzing web pages written in HTML.

<a href="breaking-news.html">Latest Updates On Breaking News</a>

In the above example, the default link function will return the string 'Latest Updates On Breaking News' when a user selects or clicks the link above.

1. c) Else if "alt" attribute/anchor "title" attribute/image "src" attributes are present: the default link function will search for three attributes of the link and its children, returning the first attribute found while investigating children of the link. In one embodiment, the link function investigates all children of the link. In order of most-to-least preferred, below is an example for where each attribute value would be used as a representation of the link clicked:
Alt text

```
<a href="breaking-news.html">
    <img alt="Breaking News Caption" src="/images/earthquake.jpg">
</a>
```

The link collected would be "Breaking News Caption"
Anchor title text

```
<a href="breaking-news.html" title="Breaking News Caption Title">
    <img src="/images/earthquake.jpg">
</a>
```

In the above example, Alt text was checked for but not found, so the next highest preference is for Anchor title text. In this example, then, 'Breaking News Caption Title' is collected as the link. Another HTML example is provided below.
Image source

```
<a href="breaking-news.html">
    <img src="/images/earthquake.jpg">
</a>
```

Neither Alt text nor Anchor title text are present, so in this case, a Src attribute is found, and the link collected would be "/images/earthquake.jpg."
Below is another HTML example of collecting a link:

```
<a href="breaking-news.html" title="Breaking News Caption Title">
    <img alt="Breaking News Caption" src="/images/earthquake.jpg">
</a>
```

The Alt text is of highest precedence, so in the above example, this link would be collected as 'Breaking News Caption.'

1. d) Else if "href" attribute is defined: if none of the previous values could be found, then the last property that will be accepted is the HREF property. An HTML example for this case is provided below:

```
<a href="breaking-news.html">
    <span id="nextPageElement"></span>
</a>
```

In the above example, since there is no text content, no alt or title or src attributes of child elements, then the href value 'next-page.html' is collected as the link ID.
Example Region Module According to an embodiment, a region module can be invoked by an analytics tool to determine region identifiers (i.e., region IDs) for selectable elements in a content page. For example, the region module can be embodied as a default implementation of the s.ActivityMap.region( ) function, which is described in the following paragraphs.

In an embodiment, a default region function takes an HTML Element, referred to herein as "ele," as input and returns a string value representing the "region" parent element of the HTML element clicked or otherwise selected. As web pages tend to have similarly categorized links organized into distinct parent elements, these parent elements help to inform where and in what regions links are clicked or selected.

According to an embodiment, the default region function uses a user-configurable attribute named regionIDAttribute to look for when deciding on which parent element to denote as the parent element clicked on. The default value of regionIDAttribute is "id." This value means that as the default region function looks at each parent element of the link clicked, the first or nearest parent element from the link that has a value for its "id" attribute will be chosen as the region and this "id" attribute's value will be collected as the region.

Another configuration an analytics tool user can select is to set regionIDAttribute as "className" and the first parent element which a className attribute would be collected as the region clicked on. If no value of the regionIDAttribute is found on any parent element, a default value of "BODY" is returned as the region clicked on. Every HTML page is made up of a BODY element, so the default region function will always return a string value: either the one found as a value of regionIDAttribute, or "BODY."

Some HTML examples of links and the region that would be collected using the region function:

```
<body>
    <header>
        <ul>
            <li>
                <a href="...">Home</a>
            </li>
            <li>
                <a href="...">About Us</a>
            </li>
        </ul>
    </header>
</body>
```

In the above example, no "id" attributes are on any parent elements of the Home and About Us links, so when either Home and About Us links are clicked (or otherwise selected), the region collected would be "BODY."

```
<body>
    <header>
        <ul id="nav">
            <li>
                <a href="...">Home</a>
            </li>
            <li>
                <a href="...">About Us</a>
            </li>
        </ul>
    </header>
</body>
```

In the above example, an "id" attribute appears on a parent element of both the Home and About Us links, so when either the Home or About Us links are clicked (or otherwise selected), the region collected would be "nav." Another example follows:

```
<body>
    <header>
        <ul id="h">
            <li>
                <a href="...">Home</a>
            </li>
```

-continued

```
        <li>
            <a href="...">About Us</a>
        </li>
    </ul>
</header>
<footer>
    <ul id="f">
        <li>
            <a href="...">Home</a>
        </li>
        <li>
            <a href="...">About Us</a>
        </li>
    </ul>
</footer>
</body>
```

In the preceding example, an "id" attribute appears on a parent element of both of similarly named Home and About Us links. When the Home and About Us links within the <header> section are clicked (or otherwise selected), the region collected would be "h." When the Home and About Us links within the <footer> section are clicked (or otherwise selected), the region collected would be "f." This is of importance because the region collected helps marketers and content providers have links with the same link text but based on differing parent elements, and thus determine which similarly named links are most (or least) popular to their users.

In the examples presented above, the analytics tool user has used the default regionIDAttribute value of "id." Below is an example where the user has set regionIDAttribute to "region."

```
<body>
    <header region="header region">
        <ul id="h">
            <li>
                <a href="...">Home</a>
            </li>
            <li>
                <a href="...">About Us</a>
            </li>
        </ul>
    </header>
    <footer region="footer region">
        <ul id="f">
            <li>
                <a href="...">Home</a>
            </li>
            <li>
                <a href="...">About Us</a>
            </li>
        </ul>
    </footer>
</body>
```

In the example above, even though a nearer parent element (e.g., the UL tags) define an "id," because the user defined regionIDAttribute as "region," then the "header region" and "footer region" values would be collected as the region when clicking the respective Home and About Us links in those regions.

Embodiments handle cases where two links fall in the same region by using the link ID. For example, if the link ID differs between these two links within the same region, they will be collected as distinct links since the uniqueness of the link is determined by the combination of the page name, the link ID, and the region ID (e.g., link region for the links) parameters. In cases where the links IDs are the same, they will be counted as the same link. A couple of HTML examples are provided below to illustrate these cases.

```
<body>
    <header>
        <ul id="header">
            <li>
                <a href="...">Home</a>
            </li>
            <li>
                <a href="...">About Us</a>
            </li>
        </ul>
    </header>
</body>
```

In the above example, assume that each link in this web page was clicked once, then Table 1 below shows the data that would be collected

TABLE 1

| Link ID | Link Region | Clicks count |
| --- | --- | --- |
| Home | header | 1 |
| About Us | header | 1 |

In the following example, another webpage would be defined with the HTML code below:

```
<body>
    <footer>
        <ul id="News Panel">
            <li>
                <a href="...">More On This...</a>
            </li>
            <li>
                <a href="...">More On This...</a>
            </li>
        </ul>
    </footer>
</body>
```

In the preceding example, if each link in the web page was clicked once, table 2 illustrates what would be collected.

TABLE 2

| Link ID | Link Region | Clicks count |
| --- | --- | --- |
| More on This . . . | News Panel | 2 |

The following paragraphs provide implementation details on how links are collected, in accordance with certain embodiments. In the example context below, a web page "Page A" is tagged with an analytics tool's AppMeasurement JavaScript library, and "Page A" has a link that navigates to "Page B" when a user clicks or selects the link. "Page B" is also tagged with AppMeasurement JavaScript library. First, a user browses to "Page A." Because "Page A" has AppMeasurement code on it, an analytics tag is sent from "Page A" upon page load: this will result in collecting one page view for "Page A."

Additionally, after sending the "Page View" tag, the AppMeasurement code also adds an event handler on the document object of the page that allows it to listen for (i.e., track) click events. When a user clicks anywhere in the page, AppMeasurement will receive the HTML element on the page that was clicked and provide that element as an argument to its AppMeasurement link and region functions.

Then, the link and region functions determine if the element is a link and has a region. If the element is deemed a link and has a region, then the string output of the link and region functions can be used to collect an Activity Map link click.

At this point, AppMeasurement needs to decide what to do with the link and region link click data. If the analytics tool user has tagged the page with the trackInlineStats configuration, then AppMeasurement can immediately collect a link click event by sending the link, region, current page name and current page type to the analytics tool.

If the analytics tool user has not tagged the page with the trackInlineStats configuration, then the link, region can be stored, via JavaScript, in a web browser cookie, along with the current report suite id, page name and page type. An example name and format of the cookie is as follows:

---
s_sq=<report suite id>=&c.&a.&activitymap.&link=<link>&region=<region>&page=<pagename>&pageIDType=&.activitymap&.a&.c

---

Next, when the browser loads "Page B," the AppMeasurement code will check to determine if the cookie contains the link, region, current page name and current page type values. If it does, it will then send them as part of the analytics tag that is sent upon Page Load.

In certain embodiments, a web analytics tool may use the object identifiers to provide interactive reports with real-time trending information for metrics in the aggregate, where the data analytics aggregated is for all or a subset of selectable objects in a content page. For example, the analytics tool may provide reports with link activity for a content page as a whole, where the link activity presented may be an aggregation of link clicks for all links in the page, or where the link activity may represent an aggregation of conversions or sales for some or all of the links or selectable objects in a content page.

In some embodiments, the web analytics tool uses the object identifiers to present link activity information based on analytics data for web page items displayed within a user interface, where the link activity may be displayed as an overlay proximate to the given item within the user interface. In displaying the link activity proximate to a corresponding selectable object in the content page, a visual association between trending information (e.g., time spent on the web page) and a corresponding selectable link may be created, which better allows a user to understand the link activity.

In certain embodiments, for example when a selectable object (e.g., a link) is included within a content page, the content browser may be modified to allow for visualizations of link activity corresponding to analytics metrics within the context of link selections in regions of a content page. Specifically, for each link, or for a subset of links within a content page, an analyst may choose to display an overlay of analytics data proximate to the link as the link is displayed within the content page. Further, for a given link in the content page, the overlay information may include various aspects of the analytics data, including link activity and trending information. In some cases, the visual presentation of the overlay itself is based upon various elements of the analytics data.

Link activity may be any aspect or aspects of link activity in a content page over a given span of time or over multiple spans of time. For instance, trending information for a link can provide a user with information on the popularity of a given link within a content page over a specified period of time, such as, for example, the last seven days, or the last eight hours. Additionally, a user can define a particular calculation to be performed based on the analytics data that uses one or more elements of the analytics data, and this user-defined calculation may serve as the basis for which trending information for links is generated and presented to a user within overlays proximate or within the context of a corresponding display page, or to a report area proximate to or within the context of the corresponding display page.

Figure 8:
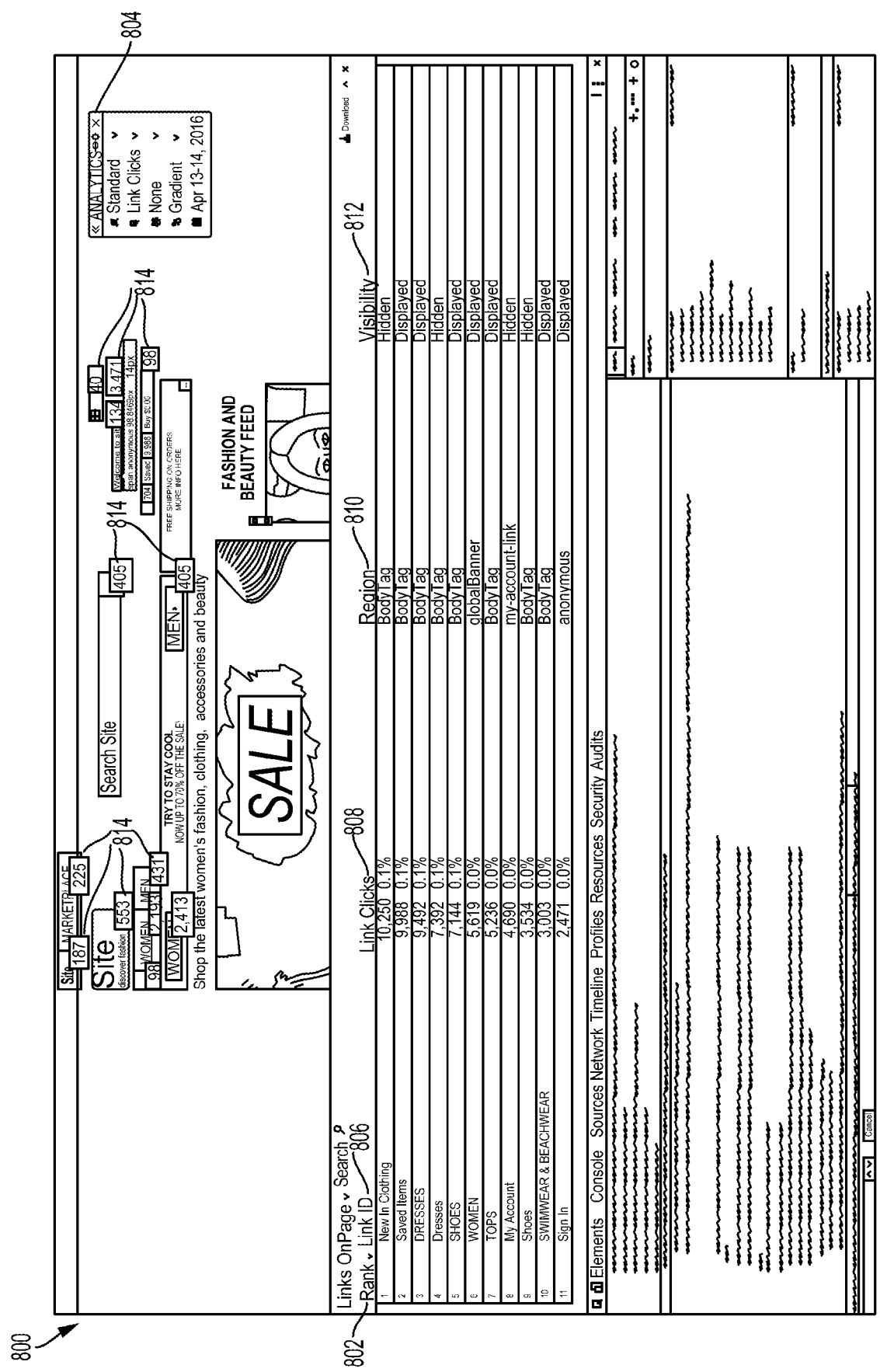
FIG. 8 illustrates a user interface for presenting an activity report for links in multiple regions of a web page, according to certain exemplary embodiments.
Figure 10:
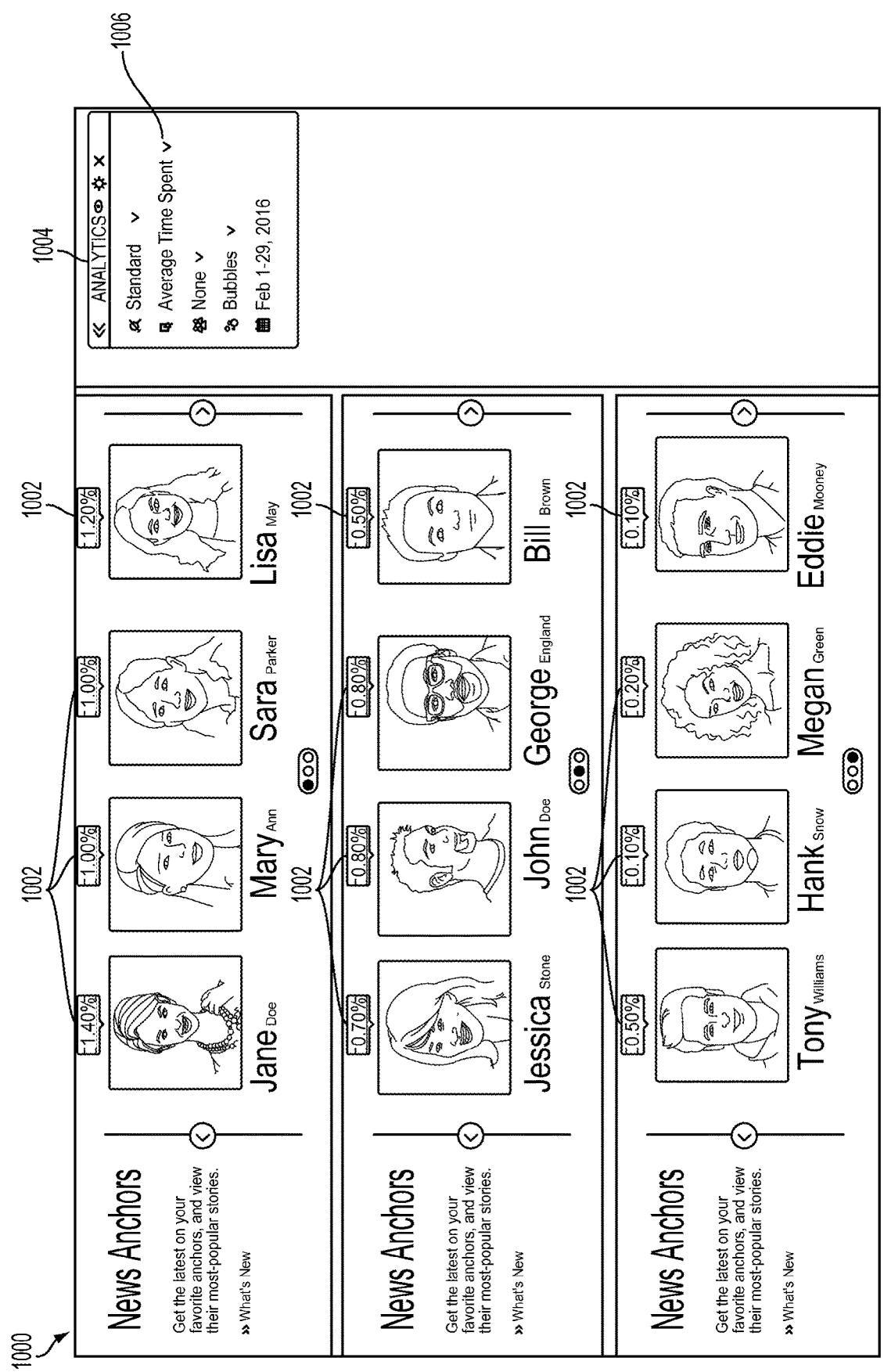
FIGS. 10-12 illustrate a user interface for displaying link performance metrics corresponding to time spent on a web site for different user segments, according to certain exemplary embodiments.
Figure 11:
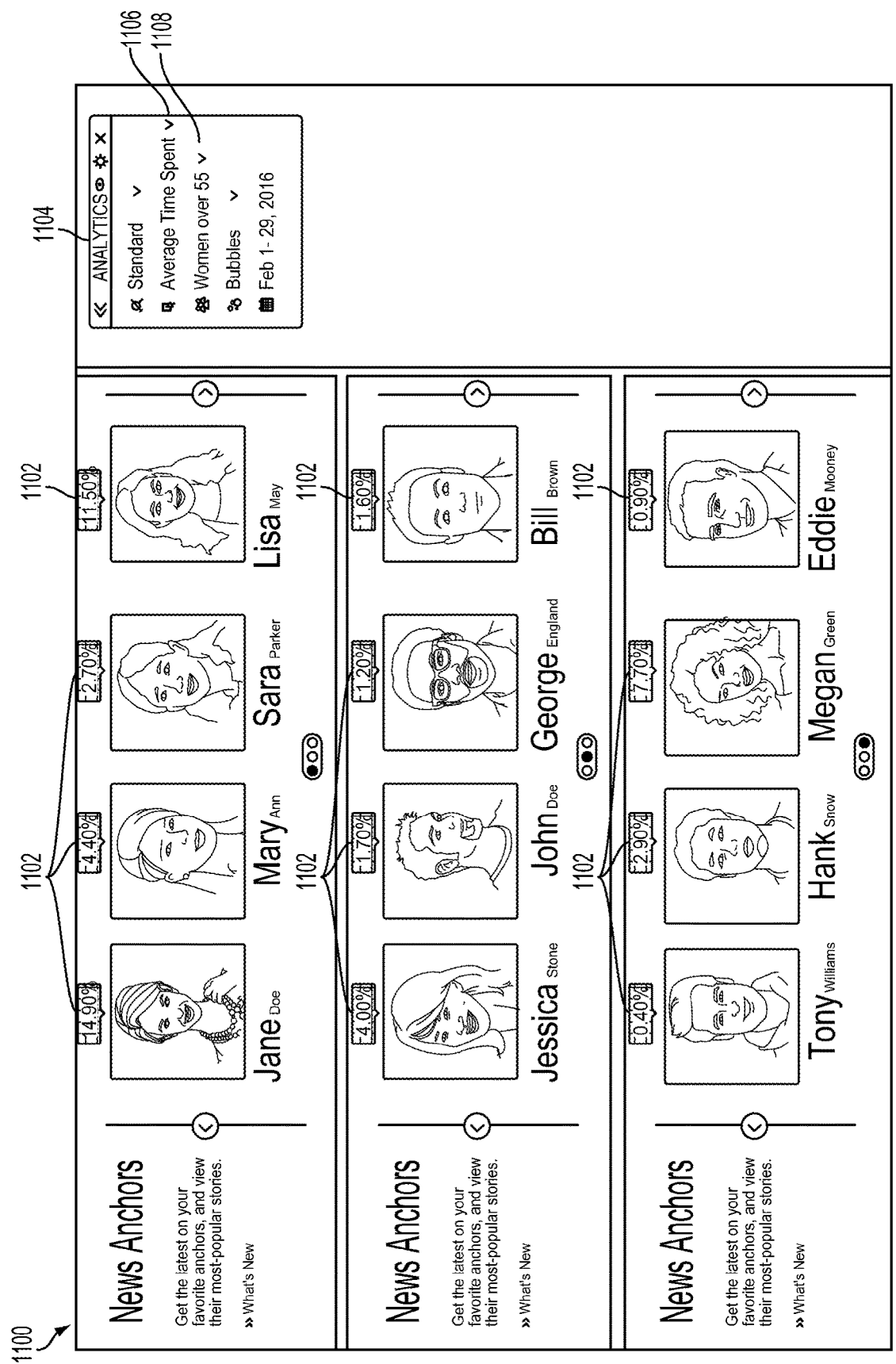
Figure 12:
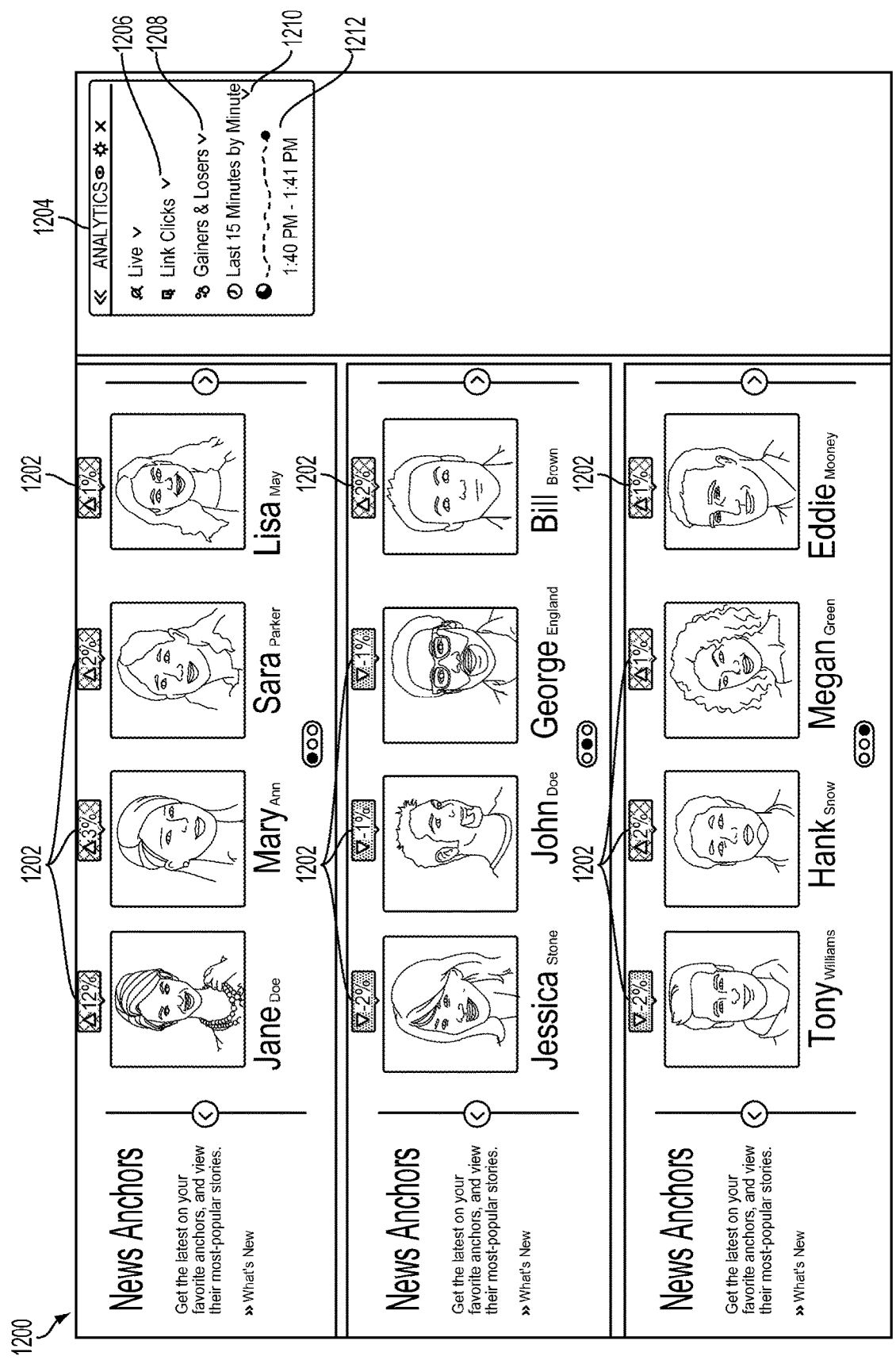

In some embodiments, the link activity may be all the information displayed within an overlay for a link, without ranking information. Further, the time granularity for the trend line or trend graph displayed within the overlay information of an overlay corresponding to a link may be configurable to any period of time. Overlays proximate to links or elements within a content page are one method for presenting analytics data. Example overlays 814 are depicted in FIG. 8, where overlays 814 simply include a number of selections of links within a content page. Additional example overlays 1002, 1102, and 1202 are shown in FIGS. 10-12, where the overlays 1002, 1102, and 1202 simply include various ranks of links with respect to the other links in the content page. However, in prior art solutions, the types of information provided within an overlay have been limited.

In one embodiment, using an analytics tool, a user may select a content site for which to analyze analytics data. Given the selection of a content site and access to corresponding analytics data, a user may select to display overlay information for one or more of the links within the content page, where the links within the content page correspond to the analytics data. The analytics tool may display the content page, including the links, and the analytics tool may further display a visual presentation of overlay information proximate to each of the links in the content page.

In some cases, only some of the entire set of links within the content page may be selected for analysis. With the objective of analyzing the analytics data in terms of link activity, a user may input a date range over which to analyze the analytics data. In response to receiving the user input indicating a date range, the analytics tool may determine, for each of the one or more links selected for displaying overlay information, respective link activity. The link activity for each of the one or more links is based on the analytics data over the date range provided as input. Given the link activity, the analytics tool may modify, for each of the one or more links, the respective visual presentation of the overlay for the given link, where the respective visual presentation of overlay information is based on the respective link activity.

In some embodiments, the network-enabled application may be a content browser or a content site development environment application, such as an HTML editor. In this way, a user may interact with user interface elements of the application to provide visualizations of analytics data corresponding to a given content page in order for the user to identify popular or unpopular links.

In some embodiments, a web analytics tool may use object identifiers to provide visualizations of data or visualizations of data analysis for any visually interactive interface where interactions with selectable objects in the interface correspond to portions of the interface such that the interactions may be tracked. For example, the analytics tool can be used to evaluate the effectiveness of certain graphical elements of a content page by tracking user interactions with the graphical elements. Based on the tracking information, an analyst may access the tracking data and apply the analytics tool to certain web pages such that visualizations of the analysis of the tracking data corresponding to respective graphical elements may be overlaid onto the web pages.

In other embodiments, a mobile phone operating system may enable tracking of user interactions with a content page displayed on a touch screen such that interactions with installed applications or interactions with elements of the mobile phone operating system are tracked using object identifiers. Using the tracking data for interactions with the mobile phone operating system, the analytics tool may display overlay information, where the overlay information displays tracking data or results of analysis of the tracking data overall or over selected spans of time. This overlay information may be useful to a developer in determining what objects in a version of a web page for the mobile operating system are popular and which elements are not popular, including object selection information that may be gathered across multiple versions of the web page for various upgrades to the mobile operating system.

In other embodiments, the object identifier generation may be implemented within an analytics report tool. The analytics report tools can allow a user to generate multiple reports. For example, a report can defined according to a link activity in regions of a content page for a particular date range specified when creating the report. Within the generated report, a user may wish to see trending information for a given selectable object displayed within the report across the particular date range. In these examples, unique object identifiers may be used to provide a user with a means for readily understanding link activity data in the report. These examples are further discussed below with regard to FIGS. 3-9.

As used herein, the term "client" refers to a logically identifiable entity that can access online content transmitted via a data network. In some embodiments, a client is associated with online content that is accessible via a single device. For example, a client may be a specific computing device, such as a smart phone identified by a particular phone number. In other embodiments, a client interacts with online content that is accessible via multiple devices. For example, a client may be a logical identifier, such as a user ID, a login, or an e-mail address, that can be used to access data from one or more computing devices (e.g., a smart phone, a laptop computer, a desktop etc.) using one or more browsers.

As used herein, the terms "online content," "web site content," and "web page content" refer to electronic content that is accessible by a computing device via the Internet and/or one or more other data networks. In some embodiments, online content includes one or more web sites or web pages hosted by one or more web servers and accessible via a browser.

The extent to which a client has interacted with online content can be determined in any suitable manner. In some embodiments, the extent to which a client has interacted with online content is determined based on whether the client clicked a link to the online content or otherwise accessed the online content. In additional or alternative embodiments, the extent to which a client has interacted with online content is determined based on whether the client accessed the online content more frequently than other online content. In additional or alternative embodiments, the extent to which a client has interacted with online content is determined based on whether the client accessed or navigated to the online content prior to accessing other online content. In additional or alternative embodiments, the extent to which a client has interacted with online content is determined based on whether the client accessed a larger amount of the online content than other online content. In additional or alternative embodiments, the extent to which a client has interacted with online content is determined based on whether the client navigated through a larger amount of the online content than other online content (e.g., by scrolling through an article, zooming on an image, rewinding or fast-forwarding a video, etc.).

Example System Embodiment: Analytics Tool

Referring now to the drawings, FIG. 1 is a block diagram depicting an example of a system including an analytics server 102 that executes an analytics tool 104 for identifying and tracking selectable objects in content. The analytics server 102 can be an analytics data server configured to store web analytics data 110 and configured to respond to queries for analytics data 110. The analytics tool 104 can invoke Activity Map module 105 to display link activity for objects selected in web pages.

The analytics server 102 can communicate with one or more content providers 116 and one or more client devices 118 via one or more of signals communicated via one or more data networks 115. The analytics server 102 can include one or more processing devices. In some embodiments, the analytics server 102 can be a single server. In other embodiments, the analytics server 102 can include multiple computing systems that are configured for distributed computer (e.g., grid-based computing, cloud computing, etc.).

The analytics server 102 can include or have access to one or more non-transitory computer-readable media on which program code and electronic data are stored. The program code includes an analytics tool 104 with Activity Map module 105. The electronic data includes one or more object identifiers 106 associated with one or more selectable objects in online content 124. As shown, each object identifier 106 can include a page identifier (page ID) 107 identifying a page within the online content 124 where the object is located; a link identifier (link ID) 108 identifying the object that is selected; and a region identifier (region ID) 109 identifying the region of the page where the object was selected. The page ID 107 can be a character string that identifies a web page (e.g., home page) within online content 124 of a web site. The link ID 108 can be a logical name that identifies an HTML object in a web page (e.g., 'my account', 'sign in', 'new items', 'sale items', 'checkout'). Similarly, the region ID 109 can be a logical name identifying a region of the web page (e.g., header, main, footer, BodyTag, globalBanner, my-account-link).

The analytics tool 104 is executable by a processing device to perform one or more operations for generating object identifiers 106 corresponding to selectable objects in the online content 124. Online content 124 can be any electronic data having interactive content with selectable objects, such as clickable images or other clickable content that is arranged according to one or more content page layouts. The content page layouts can place the selectable objects into regions of content pages within the online content 124. The regions can include, for example, a header region, a main region, a global banner region, and a footer region. Client browser applications 120 running on client devices 118 are used by clients to access online content 124 hosted on a web server 122 or other server. Various details regarding the generation of object identifiers 106 are provided herein with respect to FIG. 2.

A content provider 116 can include any computing device or group of computing devices that can access the analytics tool 104 to generate, modify, or otherwise use one or more object identifiers 106. In some embodiments, the object identifiers 106 are matched with regions and links present in online content 124 by analytics server 102. In additional or alternative embodiments, a content provider 116 remotely accesses the analytics tool 104 and uses the analytics tool 104 to generate one or more of the object identifiers 106 (e.g., via a user interface or a data entry interface presented in a web browser executed at a content provider 116).

The content provider 116 depicted in FIG. 1 includes one or more processing devices for executing one or more page authoring/editing applications 117. A page authoring/editing application 117 includes program code that can be executed at the content provider 116 for generating and editing the provider's content and using object identifiers 106. For example, a page authoring/editing application 117 may be used to generate and modify web pages. In some embodiments, a page authoring/editing application 117 can be a dedicated application installed on a non-transitory computer-readable medium that is included in or accessible to a content provider 116. In additional or alternative embodiments, a page authoring/editing application 117 can be an application for creating and modifying web pages accessible by a web browser application or other suitable application that is installed on a non-transitory computer-readable medium accessible to a content provider 116. In certain embodiments, the page authoring/editing application 117 can be also used to remotely access one or more features of the analytics tool 104.

The client device 118 depicted in FIG. 1 can be any computing device that accesses one or more other computing systems via the data network 115. Non-limiting examples of client devices 118 include smart phones, tablet devices, laptop computers, desktop computers, etc. Each client device 118 executes one or more client browser applications 120. A client browser application 120 is any application suitable for accessing and interacting with online content 124 to which the web server 122 provides access. Non-limiting examples of client browser applications 120 include web browser applications, mobile applications, and Internet applications usable to access online content 124.

The web server 122 depicted in FIG. 1 can be any server, computing device, or combination of computing devices that provides access to online content 124 (e.g., web pages for a web site) that is accessible via the Internet and/or one or more other data networks 115. Online content 124 may include a web site with links for purchasing products or services. The links are uniquely identified by object identifiers 106. As discussed above, each object identifier 106 can include a page ID 107 (e.g., a page name), a link ID 108, and a region ID 109. The online content 124 includes selectable objects (e.g., links and other clickable HTML objects) and is hosted by one or more web servers 122.

For illustrative purposes, the analytics server 102, the content provider 116, and the web server 122 are depicted as separate systems. However, other implementations are possible. For example, an analytics server 102 may perform one or more of executing the analytics tool 104, executing the page authoring/editing application 117, and executing one or more web services that provide access to the online content 124 via the Internet.

The analytics tool 104 analyzes interactions with selectable objects in the online content 124 in order to determine engagement with the online content 124. The amounts of engagement are stored as analytics data 110, which includes link activity 112.

The link activity 112 indicates how certain selectable objects in the online content 124 are interacted with via a client browser application 120. Examples of link activity 112 include clicks, revenue, and other tracked metrics for selectable objects having respective, object identifiers 106. For example, a first selectable object in the online content 124 may be an image link in a main region of a web page, and a second selectable object may be a text link in a footer region of the web page.

The analytics tool 104 can identify different levels of engagement with different types of content by tracking interactions with selectable objects within pages of online content 124. A higher level of engagement with a text content may be indicated by a user clicking a link to the text content rather than clicking links to other types of content, clicking the link to the text content prior to clicking links to the other types of content, reading or otherwise accessing certain portions of the text content (e.g., by scrolling through text content, selecting text content, or otherwise interacting with or focusing on certain portions of the text content, etc.). A higher level of engagement with image content within pages of online content 124 may be indicated by a user clicking the link to the image content rather than clicking links to other types of content, clicking the link to the image content prior to clicking links to the other types of content, viewing a threshold number of images from an image slideshow, zooming into one or more images, etc. A higher level of engagement with video content within pages of online content 124 may be indicated by a user clicking a link to the video content rather than clicking links to other types of content, clicking the link to the video content prior to clicking links to the other types of content, viewing a threshold amount of the video (e.g., playing the video for a threshold duration of time), pausing the video, rewinding the video, zooming to different portions of the video, etc.

The analytics tool 104 creates, stores, updates, maintains, or otherwise uses analytics data 110 that identify levels of engagement based on tracked and measured interactions with selectable objects in the online content 124. For example, analytics data 110 may include link activity 112 that identifies clicks on different types of selectable objects in a web page such as text and image links. As shown in FIG. 1, the analytics data 110 may also include link activity 112 measured in terms of link clicks, link rankings (e.g., relative popularity), and revenue.

The analytics tool 104 generates object identifiers 106 that are used to track interactions with links in online content 124. For example, the analytics tool 104 can be used in marketing campaigns. A marketer can use the analytics tool 104 to specify different types of online content 124 (e.g., text, images, videos, audio, etc.) associated with the campaign. The analytics tool 104 analyzes the specified online content 124 to identify one or more selectable objects within the online content 124. For example, the analytics tool 104 may determine that online content 124 includes clickable links and/or other selectable HTML objects in various regions of content pages of the online content 124.

The analytics tool 104 generates object identifiers 106 for links within different pages of online content 124 (e.g., videos, text articles, image slide shows, etc.). In the computing environment in which analytics tool 104 operates, any set of analytics data 110 may serve as the basis for generating visualizations of link activity 112. In the case of processing analytics data 110, a user of a report-building tool within analytics tool 104 may have access to the remotely or locally stored analytics data 110 that includes link activity 112 for a given content site. For example, the user may, using a report-building tool, log in to an analytics server 102 corresponding to the content site. A user may then interact with a generated report to display link activity as described below with regard to FIGS. 3-12. In some cases, a reporting tool executes on a client device 118, where the reporting tool uses an application programming interface (API) to communicate with analytics server 102 via network 115.

Other methods for accessing the analytics information are possible, and so long as analytics data can be accessed, the disclosed embodiments may operate successfully. In some cases, an analytics client tool may be implemented on a mobile application installed on a mobile device, where the mobile application implements the various embodiments of identifying selectable objects and tracking link activity described herein.

Collection of the analytics data 110 may be performed in a variety of ways, and the disclosed embodiments of an analytics tool do not depend on any particular method for the collection of analytics data. In some cases, log files may be created on a content provider server to record every transaction made between a device consuming content and the server providing the content, such as between a user operating a desktop or tablet client device 118 and web server 122, or between a user operating a mobile client device 118 and web server 122. The log files created may be periodically or aperiodically transmitted to analytics server 102 via network 115 to be stored as analytics data 110, as depicted in FIG. 1.

Another approach that may be used is page tagging or web bugs, where the request for a content page included in online content 124 may result in a content page that, upon being displayed by a user's internet-enabled application (e.g., client browser application 120 at client device 118), may initiate tracking of the user's navigation and link interaction habits and provide the link tracking information to the analytics server 102. In some cases, an image request indicated within a requested page serves as the catalyst for the execution of a script used to collect the analytics data that includes link activity. The analytics data 110 is reported along with the image request made to the analytics server 102. The actual requested image may be invisible to the user, such as a transparent 1×1 pixel, displayed within the content page.

Some types of collected analytics data 110 may be link activity 112 such as link clicks, link impressions or views, link metrics (e.g., revenue or visits associated with a link), and link click paths, among other link activity. Other types of analytics data 110 can include hits, requests for files from web server 122, page views, visits, sessions, unique visits, unique visitors, repeat visitors, new visitors, impressions (of advertisements or other content), singletons (visits where only a single page is viewed), bounce rate (percentage of singleton visits), exit percentage, visibility time, session duration, page view duration, engagement time (amount of time a visitor is on a page), page views per session, browser type, display size, and display resolution, among other metrics.

In general, any collected metric, or quantitatively measurable aspect of the analytics data 110, may be used in generating link activity 112 over a given time period or over a given series of dates. For example, a time period may be a contiguous set of dates, such as Oct. 1, 2015 through Oct. 28, 2015. In other cases, a time period may be any collection of dates or time periods, for example, the first Sunday of the past three months, or every Monday morning, from 8:00 AM EST until 12:00 PM EST, for the past 17 weeks.

Example Method for Identifying and Tracking Selectable Objects

Figure 2:
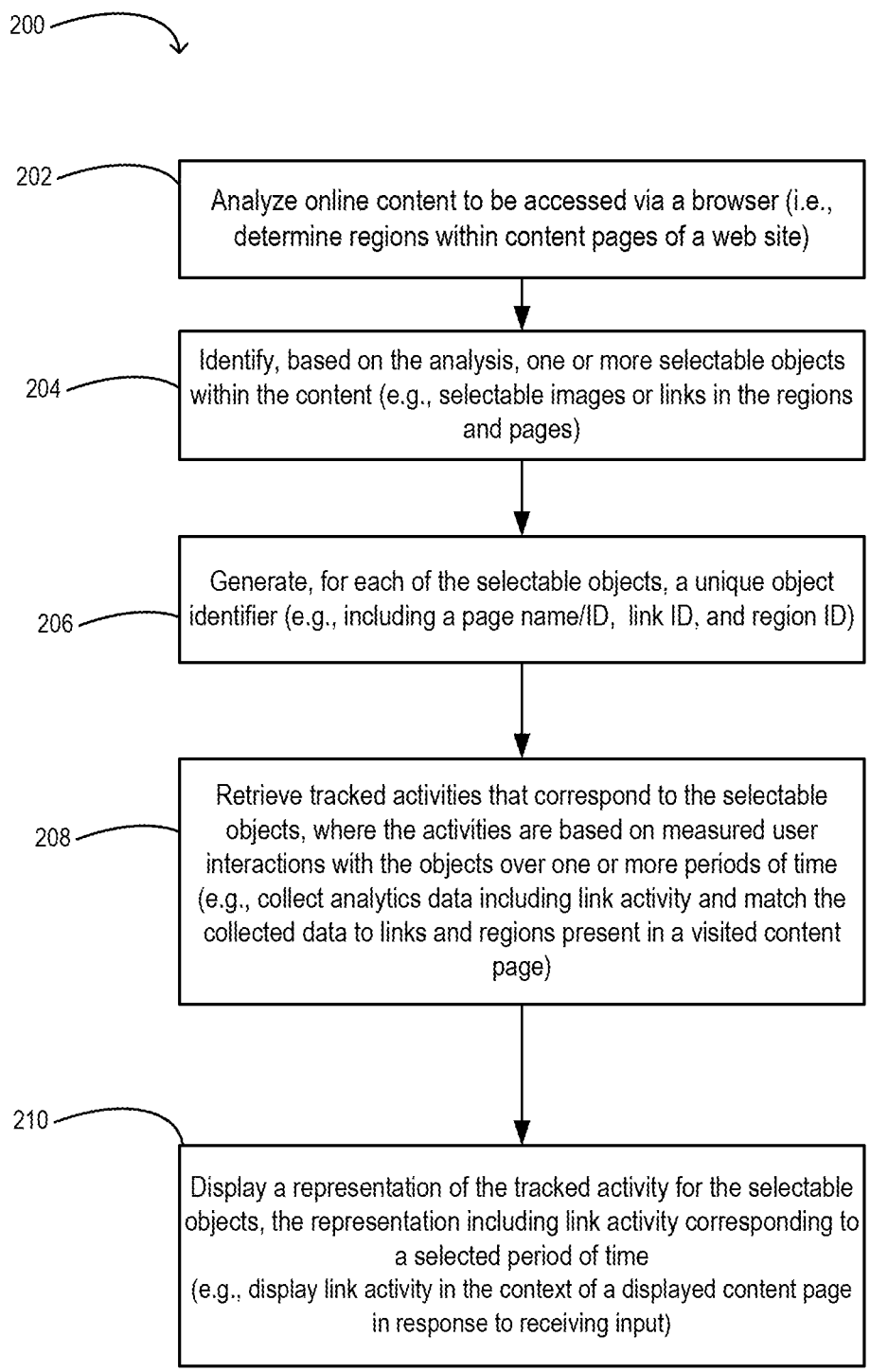
FIG. 2 is a flow chart depicting an example of a process for uniquely identifying selectable objects on a content page, according to certain exemplary embodiments.

FIG. 2 is a flow chart depicting an example of a process for identifying and tracking selectable objects. In particular, FIG. 2 depicts a flowchart illustrating a process 200 for uniquely identifying selectable objects on a content page and tracking interactions with those objects. The process 200 depicted in FIG. 2 is described with continued reference to the embodiment of FIG. 1. However, the process 200 is not limited to that example embodiment.

Process 200 can be used to identify selectable objects in content pages, generate object identifiers for the identified objects, track activities corresponding to the selectable objects, and then display a representation of the tracked activities, in accordance with embodiments. The example process 200 may, for example, be implemented by components of the system of FIG. 1. In particular, the example process 200 may be implemented by the analytics server 102, content provider 116, client device 118, and web server 122 of FIG. 1. The exemplary process 200 is performed by a processor of a computing device executing instructions to perform one or more of the following operations.

The process 200 starts at block 202 by analyzing online content to be accessed via a browser, as shown in block 202. Block 202 can be performed by analyzing content pages of online content 124 that is to be accessed using client browser application 120 on a client device 118. In the example of FIG. 2, block 202 can include determining regions within content pages of a web site.

Block 202 can comprise identifying region values for regions of web pages included in a web site (i.e., content pages included in online content 124). This can involve identifying region overlays. Block 202 can also include analyzing a web page, by looking at pages of a web site itself and looking at its form using a page-centric approach. The analysis also looks at the pages of the web site from a region-centric approach to template the web pages of the web site in order to identify regions, based on the structure and structural elements of the web site.

Next, at block 204, the process 200 further includes identifying, based on the analysis performed in block 202, one or more selectable objects within the content. As shown in FIG. 2, block 204 can comprise identifying selectable images or links in the regions and content pages of a web site.

The process 200 continues at block 206 by generating a unique object identifier for each of the selectable objects identified in block 204. With reference to the example embodiments of FIGS. 1 and 2, block 206 can include generating, for each of the identified selectable objects, unique object identifiers 106, where each object identifier 106 includes a page name/page ID 107, a link ID 108, and a region ID 109.

Block 206 can also involve storing object identifiers 106 so that they can be subsequently referred to when displaying link activity 112, as discussed below with reference to block 210. For example, the object identifiers 106 generated at block 206 can be presented in an activity map menu of an activity map interface (see, e.g., the user interfaces of FIGS. 4-6). The page ID 107 will indicate which page the link activity 112 was tracked under, link ID 108 provides a logical name for the link, and region ID 109 provides a name for the region where the selectable object is. By using the three parameters, page ID 107, link ID 108, and region ID 109, as parts of the object identifier 106, embodiments are able to readily generate link activity reports on a per region, per page, and per link basis. In certain embodiments, the object identifiers 106 are concatenations of the page ID 107, link ID 108, and region ID 109 values, which are separated by a delimiter character. In this way, the analytics tool 104 is able to quickly go from a page that was visited into the collection of links and regions that belong to that page. This allows reporting components of the analytics tool 104 to pull this data set from the link activity 112 in one query or API call by quickly breaking link activity 112 for a visited page into all the link activity 112 for regions of the page, and the link activity 112 for all tracked interactions with selectable objects that were collected under that page.

In certain embodiments, the page ID 107 parameter used in block 206 can be a page ID that is used by content providers 116 and web developers to structure their web pages. For example, such a page ID 107 parameter may be used by a user of a page authoring/editing application 117 to create submenus for dynamic web pages. In an embodiment, the page ID 107 parameter is used in conjunction with a region ID 109 as the primary identifier for a given region of a web page. Block 206 can include automatically inserting a JavaScript file into the web page with a page ID 107 and region IDs 109 in order to enable the link tracking methodology of process 200 for any web page, regardless of the type of structure of the web page. That is, block 206 generates respective, single object identifiers 106 for selectable objects in a web page that can be used to identify a region and primary link IDs 108. Block 206 also ensures that the combination of page ID 107, link ID 108, and region ID 109 results in a unique object identifier for a selectable object (e.g., an HTML link). In this way, if a user looks at the link on a smartphone, a tablet or a desktop client device 118, the object identifier 106 value will be unique for that link. If you look at the same link across different client browser applications 120 (e.g., Safari, Chrome, Internet Explorer, and other browsers), the link ID and the region ID and the page name would be the same across those browsers. In this way, the object identifiers 106 can be used to consistently and accurately identify link activity 112 across different types of client devices 118 (e.g., consistency across different laptops, desktops, tablets, and smart phones), as well as across different client browser applications 120 running on the client devices 118. That is, the object identifier 106 for a selectable object in a region of a page remains the same even if the selectable object moves to different screen coordinates due to differences in various browser applications 120 and client devices 118 used to access the page. In this way, the selectable object is identifiable as the same object across different makes and configurations of browser applications 120 and client devices 118, and user interactions with the selectable object can be consistently tracked. Next, at block 208, the process 200 further includes retrieving tracked activities that correspond to the selectable objects. As shown in FIG. 2, the activities can be based on measured user interactions with the objects over one or more periods of time. For example, block 208 can include collecting analytics data 110 including link activity 112 and matching the collected data to selectable objects (e.g., links) and regions present in a visited content page, where the regions were determined in block 202 and the objects were identified in block 204. With reference to FIG. 1, block 208 can be performed by an analytics server 102 that communicates with one or more web servers 122 over network 115 in order to retrieve analytics data 110 that includes link activity 112 for selectable objects within pages of online content 124.

Then, at block 210, the process includes displaying a representation of the tracked activity for the selectable objects that was retrieved at block 208. In the example of FIG. 2, the representation can include link activity corresponding to a selected period of time. For instance, block 210 can comprise using Activity Map module 105 to display link activity 112 in the context of a displayed content page in response to receiving input from a user of analytics tool 104 to display link activity 112 for a given range of hours or days.

Block 210 can involve reporting on link activity 112 on a per-region basis. By using regions, instead of actually reporting on every single link on a page, block 210 can display tracked activity for selectable objects within a region. For example, for a banner region such as a global banner, instead of presenting activity for individual links within the banner region, block 210 can display an overlay representing link activity 112 for all links within the global banner region. Such an overlay can indicate a total of all the link activity (e.g., link clicks) in that banner. Block 210 can look at a region, such as, for example a global banner region, not just on a single page of online content 124, but across the whole web site. This is because certain regions, like a global banner region, are repeated across all web pages.

FIG. 2 illustrates certain processing blocks of an embodiment of an analytics tool. The analytics tool may display a content page for a content site, where the content page includes multiple links, and where the links correspond to analytics data.

The analytics tool 104 may display an overlay proximate to each link in the content page within the context of the content page, as reflected in overlays 814 of FIG. 8. In some cases, only a subset of the links is selected for displaying overlays and overlay information.

Further, in some embodiments, an overlay may be displayed as a semi-transparent box surrounding or next to a given link. However, the overlay may be displayed in a variety of ways such that the overlay information within the overlay is visually distinct from the content page. For example, in certain embodiments, the overlay is displayed proximate to a given link.

More generally, the analytics tool may display the overlay such that there is a visual correspondence to indicate to a user that a given overlay corresponds to a given item, link, or element of the displayed content. For example, an icon displayed proximate to a link may be displayed such that the icon tapers to a point that points to the corresponding link. Further, in this example, when a user clicks on the icon or hovers over the icon, a callout window may be displayed with greater amounts of analytics information.

In some embodiments, overlay information, which may be based on the analytics data, may include any single determined measure, or any combination of aspects of the analytics data or any combination of raw analytics data and generated values based on the analytics data. For example, the overlay information may include a ranking for the link with respect to other links, as depicted in rank 306 of FIG. 3, where the rank of a corresponding link is relative to other links. In other cases, the ranking may be based on a formula such as a weighted average of clicks and a number of conversions, or some other user-defined formula for combining metric values of a set of analytics data.

In other examples, the overlay information may include a geographic region corresponding to the greatest number of selections for the link, or the overlay information may include link activity for the link over a date range. In the case where link activity is part of the overlay information, the link activity may be based on a default date range, where the default data range is determined prior to the display of overlays. In other cases, the link activity may be generated in response to a user selection of a date range and the receipt of an indication to include the link activity in the overlay.

In some embodiments, instead of, or in addition to, displaying link activity within an overlay, the analytics tool may display link activity in other parts of the user interface while maintaining the context of the displayed content page. For example, the link activity may be for the entire content page and may be displayed in an overlay above, below, or next to the displayed content page, as depicted with overlays 814 near image links in the content page within FIG. 8. In the example of FIG. 8, overlays 814 with the link activity (e.g., link clicks) are displayed to indicate link clicks 808 over a date range corresponding to the content page as a whole, or the link activity may be for a select group of links within the content page. Further, in the example of FIG. 8, the overlays 814 may change to correspond to analytics data for a current link being hovered over.

In other cases, the link activity displayed in overlays 814 may correspond to a currently selected link, or based on a selection of a link due to a mouse hover over the link. For example, if an analyst user hovers a cursor over a given link in the content page, the overlay display may display the link activity for the given link, and in response to the user hovering over another link, the overlay may be updated to reflect link activity for the other link.

In other cases, the overlay may show trending data for each of the links in the content page, or for a subset of the links in the content page, for example, with the display of multiple trending overlays or trending graphs corresponding to the links or subset of links. Such an example is depicted as overlays 1002, 1102, and 1202 of FIGS. 10, 11, and 12, respectively.

In response to input indicating a date range, the analytics tool may determine new link activity based on the specified date range and modify the display of the overlays according to the new link activity.

In this case, in response to receiving input specifying the date range, the analytics tool may determine or calculate respective link activity for each of one or more of the links in the content page, where the respective link activity is based on the analytics data over the specified date range.

Further, in response to receiving input specifying a new date range, the analytics tool may modify the respective visual presentation of the respective overlay information for the respective overlay for each of the one or more links in the content page, where the modification is based on the respective link activity.

Example User Interfaces for an Analytics Tool

Example user interfaces for an analytics tool are depicted in FIGS. 3-12. The user interfaces 300-1200 depicted in FIGS. 3-12 are described with reference to the embodiments of FIGS. 1 and 2. However, the user interfaces are not limited to those example embodiments.

The analytics tool 104 may, for example, be implemented on a content browser adapted to communicate with the analytics server 102 of FIG. 1 in order to present the report generation and presentation interfaces shown in FIGS. 3-12. For example, a user may provide credentials to a login screen of the analytics tool 104, where the analytics tool 104 authenticates the user login credentials with the analytics server 102, where the analytics tool 104 may then receive and display analytics data 110 corresponding to a given content page. For example, a merchant may be interested in how certain links corresponding to certain products within the merchant's home page are performing.

FIGS. 3-12 depict user interfaces. The interfaces can be used by an analyst to select criterion for link activity reports. In some embodiments, the UIs shown in FIGS. 3-12 are user interfaces of an analytics tool, such as for example, Adobe® Analytics. The user interfaces (UIs) 300-1200 depicted in FIGS. 3-12 are described with reference to the embodiments of FIGS. 1 and 2. However, the UIs are not limited to those example embodiments. In one embodiment, the UI is displayed on a display associated with analytics tool 104. In additional or alternative embodiments, the UIs can be displayed on display devices of other computing devices, such as client devices 118 connected to the analytics tool 104 via network 115, a WAN network, or the Internet. However, the reporting operations and interfaces are not intended to be limited to the example devices and platforms shown in FIG. 1. For ease of explanation, the analytics reporting operations discussed in FIGS. 3-12 are in the context of a client application executing on a computing device with a display device. It is to be understood that the user interfaces illustrated in the example embodiments of FIGS. 3-12 can be readily adapted to execute on displays of a variety of computing device platforms running a variety of operating systems that support an interactive user interface.

Throughout FIGS. 3-12, displays are shown with various sortable lists, icons, buttons, links, command regions, panels, windows, toolbars, menus, and drop down lists that are used to initiate action, invoke routines, select analytics report criteria, display analytics data such as link activity, generate analytics reports, or invoke other functionality. The initiated actions include, but are not limited to, selecting analytics data to be displayed, selecting analytics reporting criteria, generating analytics reports, and other analytics tool actions. For brevity, only the differences occurring within the figures, as compared to previous or subsequent ones of the figures, are described below.

Figure 3:
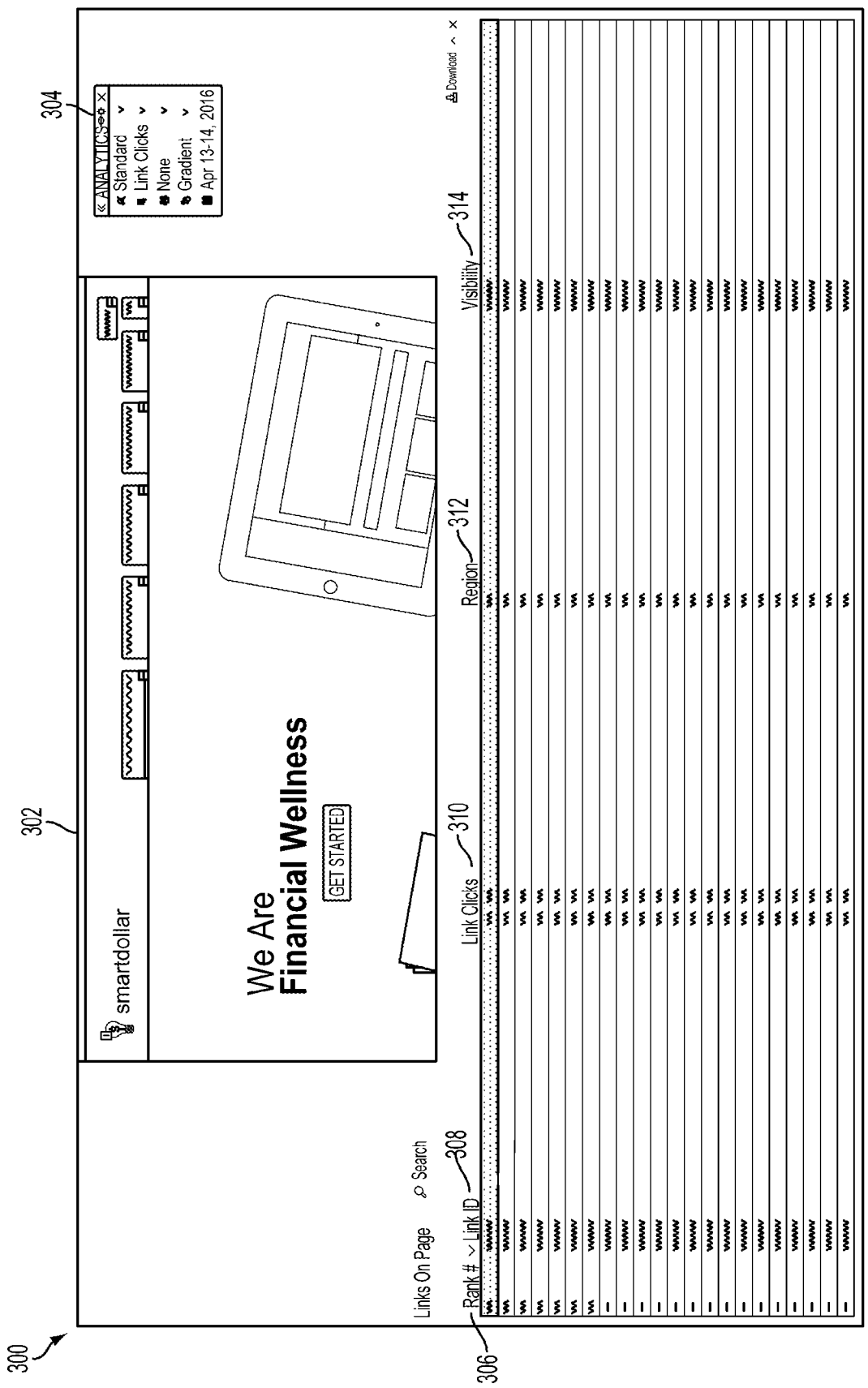
FIG. 3 illustrates a user interface for presenting ranked listings of object identifiers for selectable objects in a content page, according to certain exemplary embodiments.

FIG. 3 illustrates a user interface 300 for presenting ranked listings of object identifiers for selectable objects in a content page. In the example embodiment of FIG. 3, the analytics tool 104 may display columns of analytics data within interface 300 corresponding to link activity 112 in a content page within the context of the content page 302. In this case, the analytics data 110 is displayed in a column panel below the content page 302.

As shown in FIG. 3, within the column panel, the analytics data displayed includes sortable columns for a link rank 306, a link ID 308, link clicks 310, a region 312, and visibility 314 for links on a content page.

The analytics information displayed in the column panel may be displayed corresponding to analytics settings selected in analytics menu 304, which includes user interface elements for selecting analytics data to be displayed and a time period (e.g., a date range or range of hours).

In some embodiments, given online content 124, such as content page 302, may be displayed within a user interface of analytics tool 104, where the content page 302 includes a plurality of links, and where measured analytics data 110 corresponding to user interactions with the links is collected for each of the plurality of links. For example, analytics server 102 may track, measure, and/or collect, for each link, analytics data related to the link, and possibly aggregate of analytics data 110 for all or some of the links in the content page 302.

In some embodiments, the analytics data 110 may be for elements of content page 302 that are not selectable, such as non-selectable images. Instead, the analytics data 110 may be for the content page 302 as a whole, such as time spent viewing the content page 302. In this case, the link activity 112 may correspond to a time-spent-viewing or time spent on page metric over a given period or periods of time, and the link activity 112 may be aggregated and displayed to correspond to the page as a whole instead of any particular link or selectable object of the content page. In such an example, aggregate link activity 112 may be displayed in, for example, a panel adjacent to a display of the content page, or within a portion of a toolbar, or in some other manner such that there exists a visual association between the overall, aggregate link activity and the content page.

In an example, the analytics tool 104 may determine, for each of the plurality of links of the content page 302 displayed within the user interface 300, respective link activity based on the measured analytics data 110 over one or more periods of time selected in analytics menu 304. In other cases, the link activity 112 may be pre-calculated by the analytics server 102, and the link activity 112 is simply received or retrieved from the analytics tool 104, thus allowing the analytics tool 104 to avoid performing calculations of the link activity 112 before it is displayed in interface 300.

The respective time periods may all be set to be the same or the respective time periods may be each tailored or adjusted individually via selections made in analytics menu 304. For example, an analyst may interact with analytics menu 304 to set a default value for a time period of two days, in which case the analytics tool may calculate link activity 112 for content page 302 accordingly. Once sorted link activity (e.g., link rankings 306 and link clicks 310 for link IDs 308 by link regions 312), or an overlay (see, e.g., overlays 814 in FIG. 8) is displayed with the initially calculated link activity 112, an analyst may select a different time period in analytics menu 304 over which the link activity 112 is to be calculated.

In some cases, the set of the plurality of links may be all or some subset of all of the links in content page 302. For example, on a content page with 100 links or selectable objects or elements corresponding to measured analytics data 110, the analytics tool 104 may perform the determination of link activity 112 for only the top 50 trafficked links, objects, or elements. In some cases, the analytics tool 104 may automatically determine for which links/objects/elements to display in interface 300 based on limitations of the display with regard to possibly overcrowding the user interface 300 with too much information and based on a ranking of the link/object/element.

In other cases, the analytics tool 104 may select a subset of the links, images, objects, or elements on a content page 302 based on a category of analytics data or a category of the link, image, object, or element. For example, link activity 112 may be only be determined for links, images, objects, or elements leading to a sale or sales (e.g., a conversion) over a certain amount or to some other aspect or metric of the analytics data 110. In other cases, the link activity 112 may be determined for links, images, objects, or elements for the top 30, or top 20, or top user-selected amount of most active links.

Given a determination of link activity 112 for the plurality of selectable objects within content page 302, the analytics tool 104 may then provide or display the link activity 112 in response to user input requesting that link activity be displayed in ascending or descending ranked order. For example, a user may provide input such as clicking on a down arrow near the link rank 306 within the analytics tool user interface 300 depicted in FIG. 3.

In some embodiments, a user may right-click over a specific link within the content page 302 and select from a menu of options to enable link activity 112 information for the specific link. In other embodiment, different types of input may be provided, for example through the visual recognition of a gesture or through some other means.

In response to receiving the input, the analytics tool 104 may display, within context of the content page 302 displayed in the user interface 300, the respective link activity 112 information for each of the plurality of links, as reflected the list of link ranks 306, link IDs 308, link clicks 310, link regions 312, and link visibilities 314 in FIG. 3.

Figure 4:
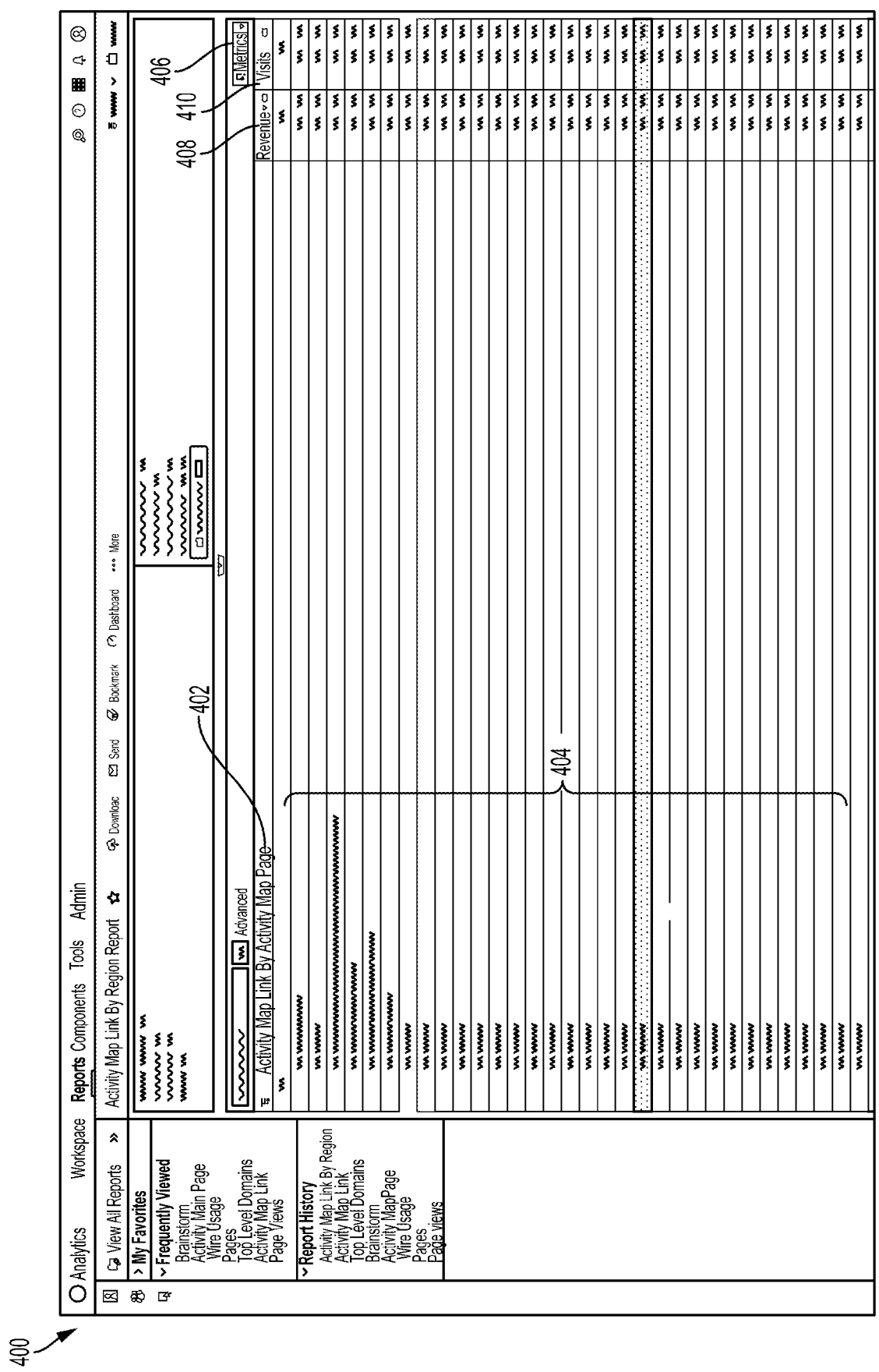
FIG. 4 illustrates a user interface for presenting an activity map link by region report, according to certain exemplary embodiments.

FIG. 4 illustrates a user interface 400 for presenting an activity map link by region report. User interface 400 can present an activity map link by activity map page 402 that includes link activity 112 for various links 404 in regions of a web page. As shown in FIG. 4, the link activity can include metrics 406 that measure revenue 408 and visits 410 for each of the links 404 that are listed in the activity map link by activity map page 402.

Figure 5:
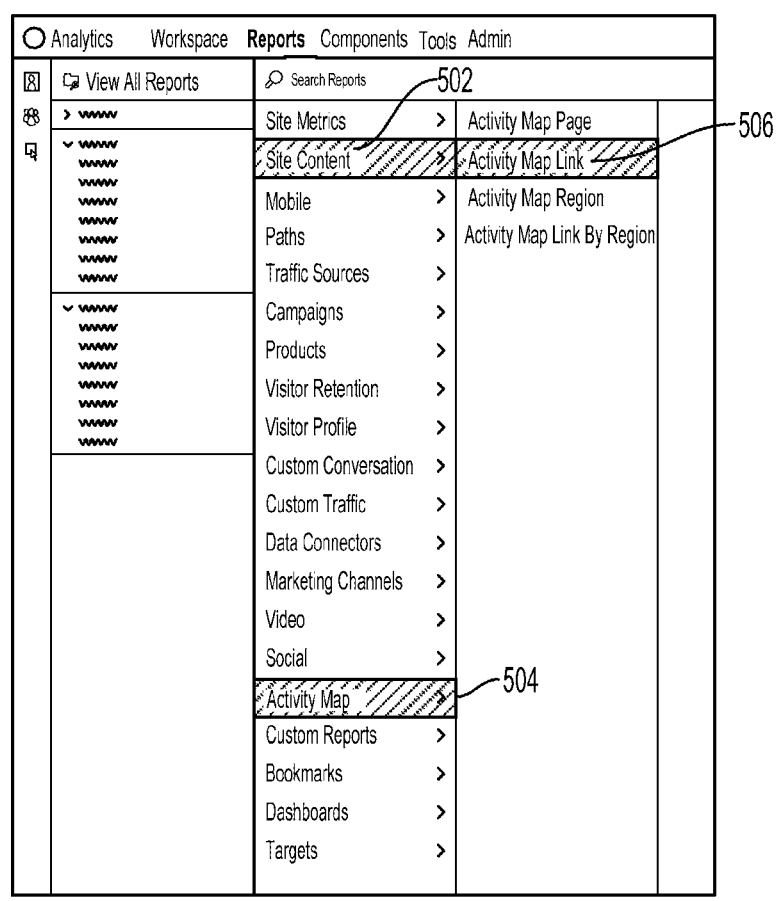
FIG. 5 illustrates a user interface for generating an activity map link report for a web site, according to certain exemplary embodiments.

FIG. 5 illustrates a user interface 500 for generating an activity map link report for a web site. User interface 500 includes an analytics report menu for selecting analytics reports corresponding to site content 502, an activity map 504, and an activity map link 506. By selecting the menu options shown in interface 500, a user of analytics tool 104 can generate the example reports shown in FIGS. 6-9, which are discussed below.

Figure 6:
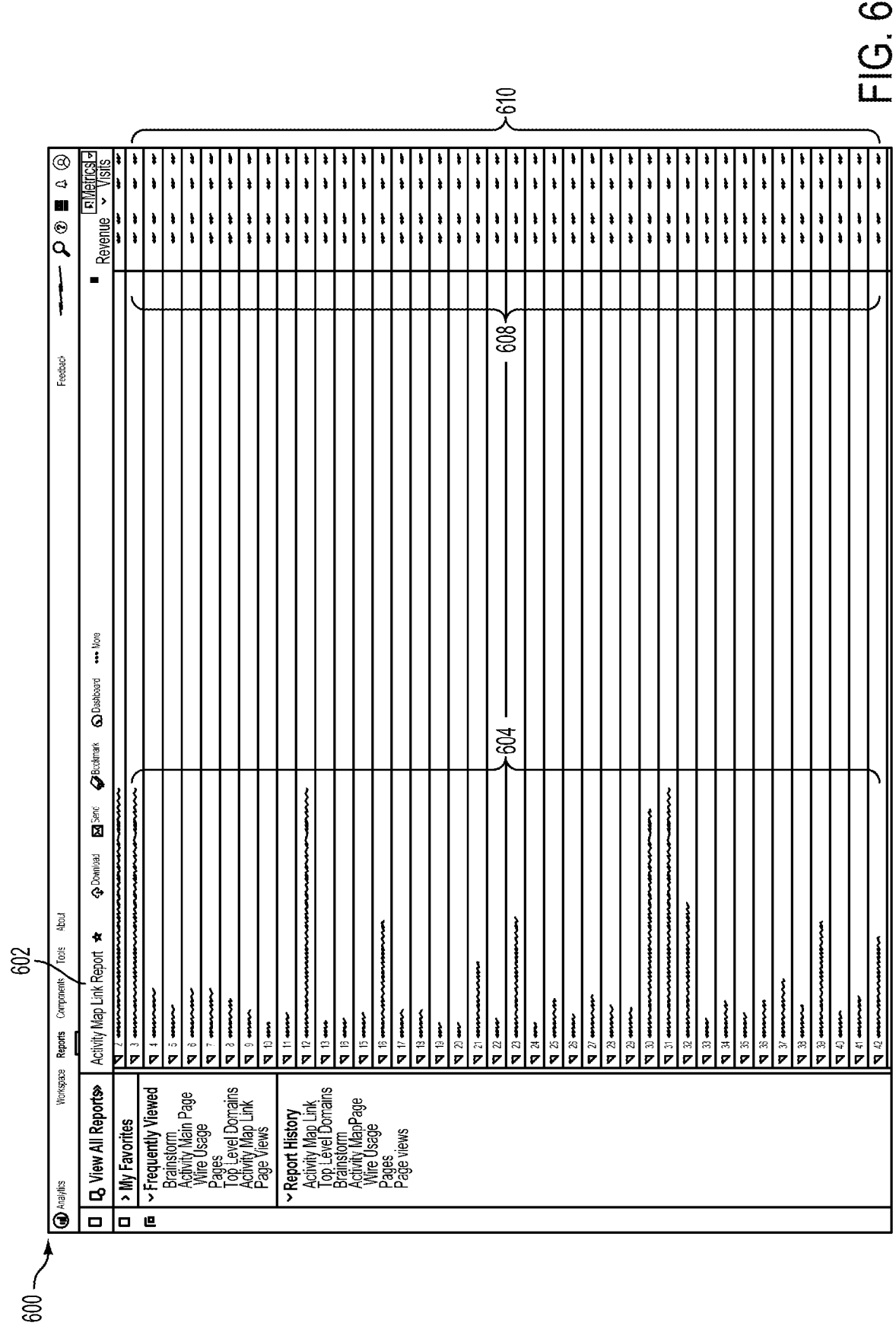
FIG. 6 illustrates a user interface for presenting an activity map link report for a web site, according to certain exemplary embodiments.

FIG. 6 illustrates a user interface 600 for presenting an activity map link report 602 for a web site. In particular, activity map link report 602 can be displayed by analytics tool 104 in response to selections made in the menus of interface 500 to display revenue 608 and visits 610 metrics corresponding to user interactions with selectable objects 604 of a web site.

Figure 7:
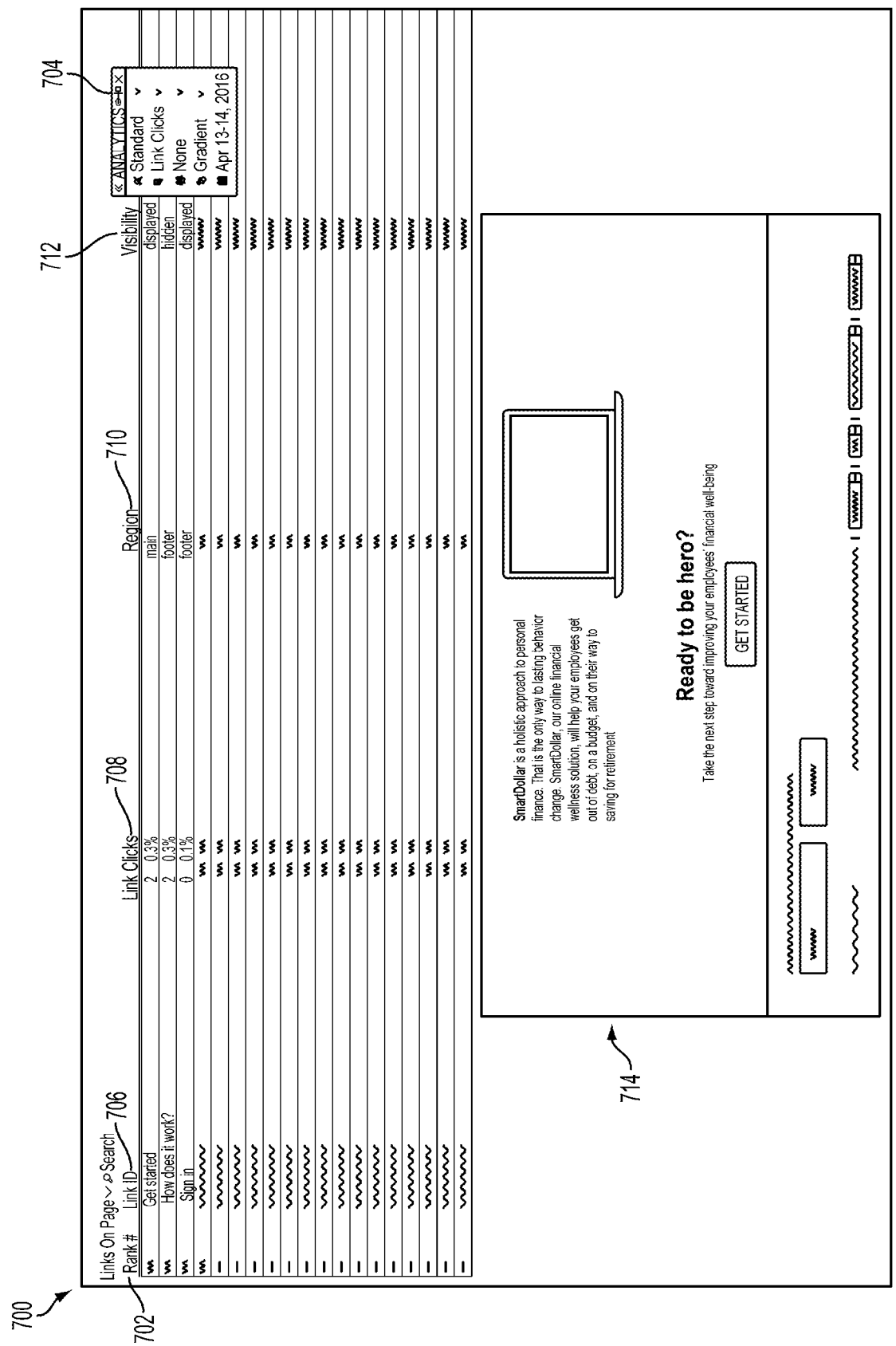
FIG. 7 illustrates a user interface for presenting an activity link report with sub-links repeated in multiple regions of a web page, according to certain exemplary embodiments.

FIG. 7 illustrates a user interface 700 for presenting an activity link report with sub-links repeated in multiple regions of a web page 714. As shown in interface 700, the activity link report can include sortable lists of link rankings 702 and link clicks 708 for link IDs 706 that are in different regions 710 of web page 714. In the example of FIG. 7, the activity link report can also list a visibility attribute 712 for the listed link IDs 706. The link activity 112 metrics and time period to be included in the activity link report can be selected in analytics menu 704.

FIG. 8 illustrates a user interface 800 for presenting an activity report for links in multiple regions of a web page. After logging in to access the analytics data 110 from the analytics server 102, or analytics servers, the analytics tool 110 may provide a user interface element for enabling the display of analytics data overlays, such as overlays 814 of FIG. 8.

Link activity 112 may be displayed, for example, within an overlay proximate to a respective link, image, object, or element of the content page, as illustrated within overlays 814 of FIG. 8. In FIG. 8, overlays 814 may appear as a popup alongside, or in some cases, within content page elements corresponding to a segment of analytics data serving as the basis for the link activity and the analytics data within overlays 814.

In some embodiments, instead of displaying the link activity in response to user input from a user interface element, the analytics tool may instead receive a request from another application to display the content page with the link activity. For example, a third party application, through an application programming interface (API) implemented within the analytics tool 104, may request an image of a content page to be returned such that the image includes the link activity as it would be visible, for example in FIGS. 8 and 10-12.

In certain embodiments, analytics tool 104 can be incorporated into a content browser, such as a client browser application 120 running on a client device 118. Such a component, as implemented within the content browser, may enable the content browser to display link activity 112 for a content page of a content site, where the content page includes multiple links, and where the links correspond to analytics data 110. In this example, the modified content browser can function as front end or client for analytics tool 104.

The analytics tool 104 may, for each of one or more of the total number of links in a content page of online content 124, determine respective link activity 112 based on the analytics data 110 over a date range. For example, for a given link within the content page, the analytics tool 104 may communicate with analytics server 102 to query the analytics server 102 for link activity 112 based on parameters identifying the link, the content page, and the date range, among other possible parameters.

Given a determination of respective link activity 112 for each of the one or more links in the content page, the analytics tool 104 may display a respective visual presentation of respective overlay information for the one or more links. Further, the respective visual information for the respective overlay information may be displayed proximate to its corresponding link and may include the respective link activity, as reflected in overlays 814 of FIG. 8.

In response to the user enabling, requesting, or initiating the display of analytics data overlays, the analytics tool may then display, proximate to a given link for a product, an overlay of analytics data. The displayed overlay may include link activity, which may provide a user with a better understanding of the analytics data as compared to a simple set of analytics numbers.

For example, instead of simply displaying an overlay 814 with information indicating that the 'search' link has been clicked 405 times in the past two days, the analytics tool 110 may display a graph within the overlay providing a visual representation of the trend of the click data. For example, if half of the 405 clicks have occurred in the past day, the user may reach a different understanding of what is going on than if clicks were evenly distributed over the past two days.

In some cases, the link activity 112 may allow an analyst with the option of being able to correlate an increase or decrease in traffic corresponding to a particular link or selectable image or object in a content page with a particular event or version or release of the content. For example, if a content page was updated two days ago and the link activity spans the previous seven days, an analyst may observe whether any trends in the data for a given link have occurred since the update two days ago.

Figure 9:
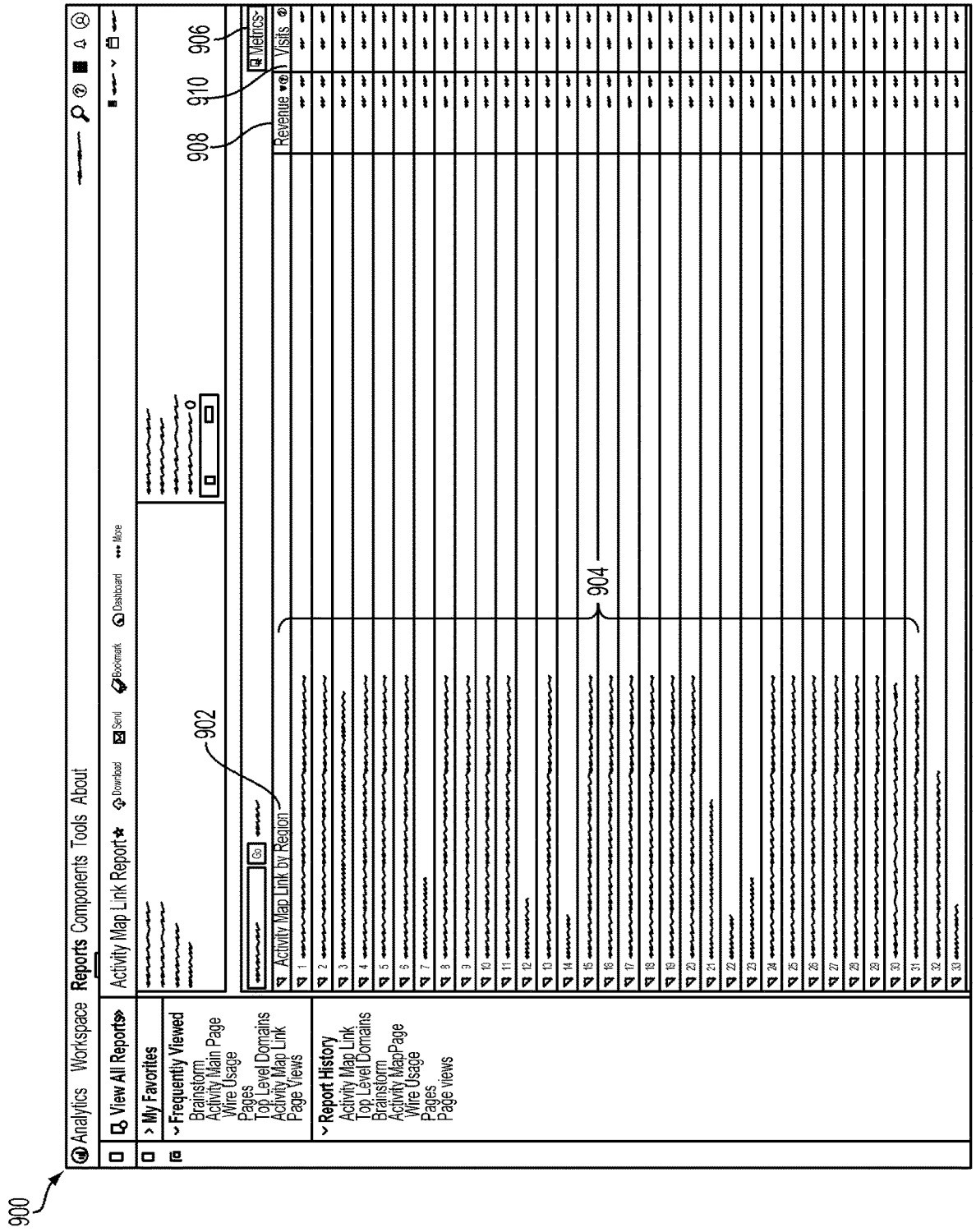
FIG. 9 illustrates a user interface for presenting an activity map link report for regions of a web page, according to certain exemplary embodiments.

FIG. 9 illustrates a user interface 900 for presenting an activity map link report for regions of a web page. Interface 900 presents an activity map link by region report 902 that lists sorted metrics 906 for links 904 within a selected region of a web page. As shown, the activity map link by region report 902 can include revenue 908 and visits 910 metrics for links 904.

In some embodiments, to begin, analytics tool 104 may display a content page in interface 1000, where the content page may include multiple selectable objects, and where the selectable objects may each correspond to measured or collected analytics data 110. In some cases, the selectable objects may be elements of a content page such as images, links, buttons, HTML objects, or any other possible selectable component of the content page.

The content page displayed may be identified, for example, with a page name or URL. The analytics tool 104 may then provide the page name, page ID 107, or URL to the analytics server 102 so that the analytics server may provide the analytics data corresponding to the content page identified with the name, ID, or URL. In some cases, a user may simply specify a domain name, for example, through a selection of a domain name provided in analytics menu 1004 of interface 1000. Further, once the initial content page is displayed, the user may navigate through to any connected content pages, for example, with a click, or some other user interface input, on a link within the content page.

Given a displayed content page that includes the multiple items, the analytics tool may retrieve link activity that corresponds to the multiple selectable objects, where the multiple selectable objects may be some or all of the selectable objects within the content page. The retrieval of the link activity 112 is reflected in overlays 814, and in sorted listing of analytics data 110 for the content page over the periods of time shown in analytics menu 804.

Within context of the displayed content page in interface 800, the analytics tool 104 may display a presentation of link activity for each of the selectable objects in the content page, where the presentation of link activity for a given item is based on one or more portions of the retrieved link activity 112 corresponding to the given item. As shown in FIG. 8, this link activity 112 can include sorted link ranks 802 and link clicks 808 for link IDs 806 that are in regions 810 of the content page.

FIG. 8 depicts a user interface 800 that displays a content page that has been updated to reflect link activity in overlays 814. In this example, the interface 800 displays the rank 802, link ID 806, link clicks 808, region 810, and visibility 812 for links on the content page.

The analytics tool can use the unique link IDs 806 to render, in the content page, overlays 814 that are displayed proximate to links in the content page. In some cases, only a subset of links may be selected for displaying overlay information and/or link activity.

For example, some overlays 814 correspond to tracked interactions with image and text links in the page, where the overlays 814 include respective number displays, and where the numbers displayed in the overlays 814 indicate a metric (e.g., a number of clicks, a ranking, or revenue) over a period of time. In some cases, the period of time is a default value defined prior to the user entering the interface 800. In other cases, the report is updated dynamically upon a user selecting a period of time in the analytics menu 804, in this example, two days. The window of time is used as a filter of the analytics data 110 in order to generate link rankings 802 corresponding only to the selected window of time. Overlays 814, ranks 802, and link clicks 808 correspond to the interactions with linkable text or images in the content page over the selected two days, in this case.

In some embodiments, the numbers displayed within the overlays 814 may correspond to some other aspect of the analytics data 110, such as a correspondence to conversions, or to any other user selected aspect of the analytics data 110. The number displayed within the overlay may correspond to any user-defined configuration setting defined prior to entering the interface 800, or the user may modify the number to display while in the interface 800 by selecting menu items in analytics menu 804.

In some cases, the user may define not simply an extracted value or aspect of the analytics data 110, but the user may defined some customized calculation to be performed based on multiple aspects of the analytics data 110, such as a value based on the ranking as weighted according to conversions, or a ranking multiplied by a factor corresponding to a given search engine.

In some embodiments, interface 800 includes link activity 112 presented for the entire content page, in which case interface 800 may be an aggregate representation of link activity 112 for the content page as a whole, for a subset of the selectable objects within regions of the content page, for all selectable objects of the content page, or a combination of these measures of link activity. For example, interface 800 may represent link activity 112 for the number of views of the content page, or for some other measured metric of the content page. In other cases, interface 800 may present aggregated link 112 activity for the top 20 link IDs 806 (e.g., links with the top 20 ranks 802), or top user-configurable number of selectable objects.

In some embodiments, interface 800 may be based on the same aspect of the analytics data 110 which the values in the overlays 814 are based. For example, if the respective overlays 814 are defined to correspond to the number of clicks for a corresponding link, then a value displayed within a given overlay 814 represents the number of clicks for the given link in the content page. In some cases, a user may select a given overlay or a given link, and upon selection, the overlay value may be updated to reflect only the value in the overlay over a specified duration (e.g., a window of time expressed in hours or days). In some cases, an analyst user may select a group of links fewer than all links in the content page, for example, selecting a first link which result in the graph being updated, and then holding down the SHIFT key to select a second link, or overlay 814, and in response the value may be updated to reflect the two selected links. The user may continue this process until every link in the content page is selected.

In some embodiments, the overlays 814 are responsive to user input to display an even greater quantity of information. For example, if a user hovers a cursor over an overlay 814, the overlay may expand to display multiple aspects of the analytics data 110 corresponding to the link with which the overlay 814 corresponds.

FIGS. 10-12 illustrate a user interface for displaying link performance metrics corresponding to time spent on a web site for different user segments. In particular, FIGS. 10, 11, and 12 depict user interfaces 1000, 1100, and 1200 that reflect user selections made in analytics menus 1004, 1104, and 1204, respectively, of information to be included in overlays 1002, 1102, and 1202. In particular, user interfaces 1000, 1100, and 1200 convey analytics data 110 and link activity 112 that enables an analyst user to understand how different audience segments engage with online content 124. In the examples of FIGS. 10-12, analytics data 110 is presented that enables a user to analyze how links and content related to news anchors are performing.

In response to a user modifying the time period focus of the overlay information in analytics menus 1004, 1104, and 1204, respectively, the display values in overlays 1002, 1102, and 1202 automatically change to correspond to the currently selected time period focus. In this way, a user may see a visualization of the analytics data 110, including link activity 112, across an arbitrary span of time such that the analytics data 110 is focused on the currently selected link and link overlay.

FIG. 10 shows an interface 1000 that can be generated by Activity Map module 105, which can display link overlays 1002 with a variety of analytics data 110 metrics. In particular, interface 1000 is presented as a result of a user selecting the 'average time spent' 1006 drop down control in analytics menu 1004. This selection results in interface 1000 displaying overlays 1002 indicating which news anchors lead to longer times spent on the content site by site visitors.

Given that the longer visitors stay on a web site, the more revenue they generate, the 'average time spent' on the site is a good metric to measure a link's performance.

The news anchors shown on the first tab (top row) of interface 1000 lead to higher time spent on site for the February timeframe. This is indicated in overlays 1002 shown in the top row with values of 1.40%, 1.00%, 1.00%, and 1.20%. Thus, showing these four news anchors on the first tab of the page is a sound strategy that will lead to longer visitor sessions, and therefore higher revenue.

In some cases, the expanded overlay may include information similar to the overlays 1002, 1102, and 1202 shown in FIGS. 10-12, discussed below. These overlays 1002, 1102, and 1202 can include data reflective of link activity for the corresponding link in terms of percentages and trending information for time spent on a content page. Such expanded overlay information may be manipulated. For example, a user may make a time selection in analytics menus 1004, 1104, or 1204 to change the time period focus on which the overlay information is based, and the overlay information in overlays 1002, 1102, and 1202 may then be synchronized to the currently selected point in time.

FIG. 11 shows an interface 1100 for tracking an audience segment in the analytics tool 104 corresponding to 'Women over 55', as selected via the audience segment 1108 drop down control in analytics menu 1104. Activity Map module 105 can then segment the 'average Time Spent' on site overlays 1102 for the selected 'Women over 55' audience segment. In the example of FIG. 11, 'Megan Green' in the third tab (i.e., third row) is doing very well for that demographic (see the 7.70% metric in overlay 1102 for Megan Green). As a result, an analyst may decide to promote the link corresponding to this news anchor to the first tab, in place of news anchor Sarah Parker when the web page is visited by a woman over 55.

FIG. 12 shows an interface 1200 for displaying a trending traffic metric in overlays 1202. As shown, the trends can be shown down to a minute-by-minute granularity. For example, by selecting the 'Last 15 minutes by minute' 1210 drop down control and by choosing the Gainers and Losers 1208 drop down control in the analytics menu 1204, overlays 1202 can indicate which news anchors have gained in popularity over the last few minutes. In this example, overlays 1202 are trending overlays that express upward and downward trends for respective selectable objects corresponding to individual news anchors. As shown in FIG. 12, analytics menu 1204 also includes an interactive time line 1212 that can be used to select a point in time within a range of time. For example, after a range of time is selected using the 'Last 15 minutes by minute' 1210 drop down control, a specific point in time within that range can be selected by clicking on a point along time line 1212 in order to show trending graphs or trending data in overlays 1202.

In the example of FIG. 12, interface 1200 represents link activity 112 captured a few minutes into the start of Jane Doe's television show. As shown, in overlay 1202 with a value of a 12% increase for Jane Doe, there is clearly a significant uptick on Jane's link (left-most link in top row of interface 1200). As a result, an analyst may want to target Jane's followers in display ads when her TV shows goes live or is otherwise broadcast.

Through using the time spent on site metric overlays 1002 and segmentation overlays 1102, an analyst can readily ensure that a web page is optimized to maximize revenue. For example, the Activity Map module 105 can produce minute trend reporting with and trend overlays 1202 as shown in FIG. 12 to enable an analyst to discover micro trends (e.g., minute-by-minute trends) for the web site that can also be further monetized.

As an example, trend overlays 1202 in FIG. 12 includes a summary of analytics data 110 corresponding to image links shown in interface 1200, where the expanded overlay 1202 is displayed in response to a user selecting the gainers and losers 1208 metric in analytics menu 1204. The gainers and losers 1208 metrics includes aspects of the analytics data 110 to indicate which image links are trending up (i.e., gaining) and which are trending down (i.e., losing) in popularity. The gainers and losers 1208 metric can be measured in terms of time spent on the web site and/or other ranking information such as click counts, over the interval of time over which the analytics data 110 within the overlay is defined. The 'Gainers and Losers' 1208 drop down control can allow an analyst to color code each of the overlays to reflect link activity.

In other embodiments, an analyst user may select inflection points across a span of time in the analytics menu 1204. For example, a user may select time span of an arbitrary period of time in the 'by minute' 1210 drop down control, for example, the last 15 minutes, such that a snapshot image is created for each inflection point. In other words, each time link activity changes from positive to negative or from negative to positive, at the point the change occurs, a snapshot image of the content page and the corresponding overlay information for overlays 1202 is created and stored. In this way, based simply on the number of snapshots created, an analyst user may have a sense of how many trending changes occurred and have an image of the corresponding overlay information.

FIG. 12 illustrates a user interface 1302 for a report generation tool modified to support the functionality of the embodiments of an analytics tool. In this example, the report generation tool is referred to as an analytics tool.

As discussed above, a report generation tool is often used by an analyst to understand different aspects of analytics data 110. As depicted in FIGS. 3, 8, and 10-12, reports can be generated for a particular content site, where the date range over which analytics data is used is specified (e.g., via selections in analytics menus 304, 804, 1004, 1104, and 1204).

A report may generally include dimension items, segments, and metrics. For example, a report can include a page views metric, date segments, audience segments, and other analytics data items. The metric data within a given cell of the report can be an aggregated value over the given date range. While a user may separately generate a report to display link activity 112, the analytics tool 104 allows a user to see link activity 112 within the context of selected web page regions or for an entire web page.

For example, upon hovering over a report cell, the analytics tool 104 may display an overlay that includes link activity for the metric value as filtered according to the row and column segments and dimension items. In this way, an analyst user may see that for a given metric value in a given cell, how the metric value is trending. For example, while a cell may indicate the aggregate metric value over the last 15 minutes, if half of the metric values, in this case time spent on site, were tracked or recorded in the past 7 minutes, then the trend information may provide a user with a better understanding of how the data is behaving.

In some cases, to see the link activity within an overlay 1202, a user may click or select trending of link clicks 1206 and gainers and losers 1208 to sort the links according to link activity 112 instead of according to aggregate totals. For example, the links may be sorted according to which links are most quickly trending up in terms of clicks.

In short, link activity 112 may be useful to generated analytics reports to make retrieval or viewing of trending information more efficient.

Example Computer System

Figure 13:
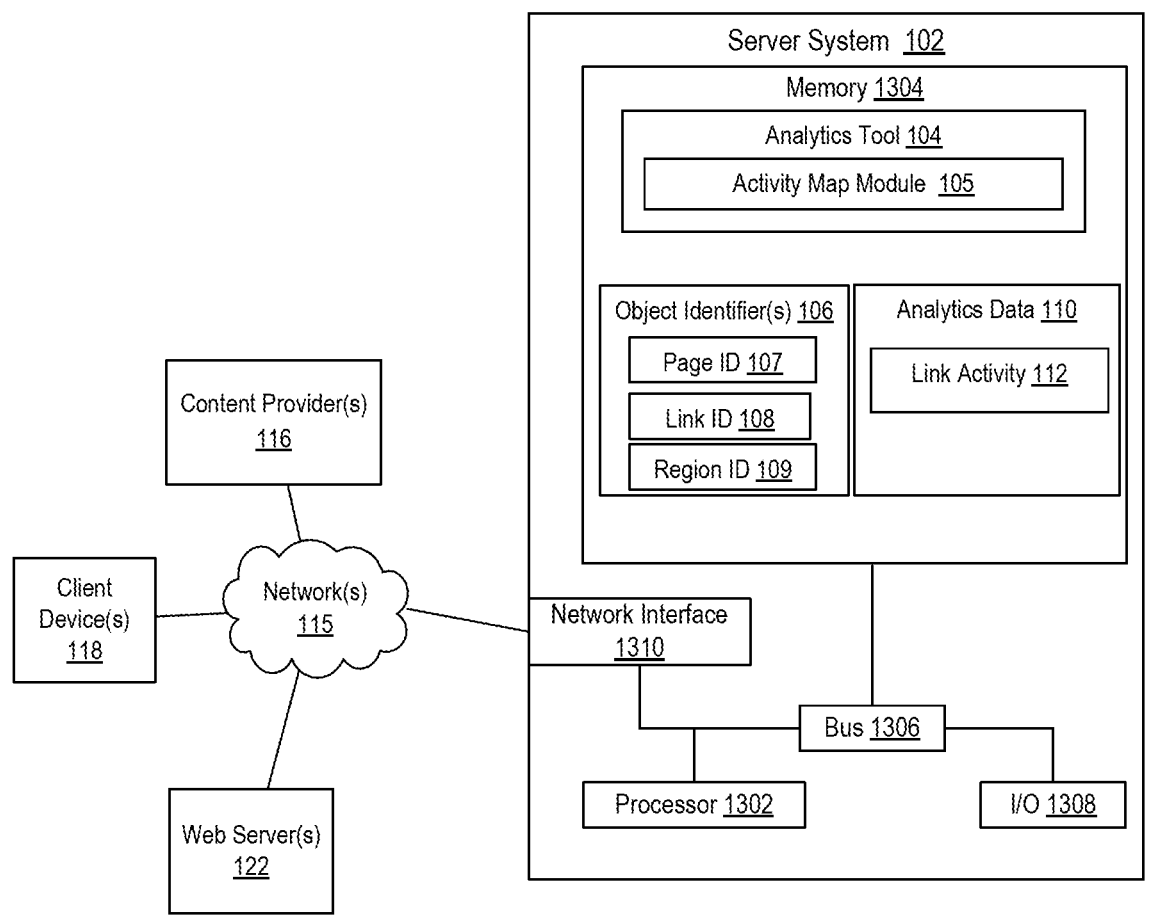
FIG. 13 is a block diagram depicting an example of a server system that executes the electronic data processing application for automatically identifying and tracking selectable objects in a content page according to certain exemplary embodiments.

Any suitable computing system or group of computing systems can be used to implement the analytics server 102 described above with reference to FIG. 1. For example, FIG. 13 is a block diagram depicting an example of an analytics server 102 that executes the analytics tool 104 for automatically identifying and tracking selectable objects in content pages.

The analytics server 102 can include a processor 1302 that is communicatively coupled to a memory 1304 and that executes computer-executable program code and/or accesses information stored in the memory 1304. The processor 1302 may comprise a microprocessor, an application-specific integrated circuit ("ASIC"), a state machine, or other processing device. The processor 1302 can include any of a number of processing devices, including one. Such a processor can include or may be in communication with a computer-readable medium storing instructions that, when executed by the processor 1302, cause the processor to perform the operations described herein.

The memory 1304 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The analytics server 102 may also comprise a number of external or internal devices such as input or output devices. For example, the analytics server 102 is shown with an input/output ("I/O") interface 1308 that can receive input from input devices or provide output to output devices. A bus 1306 can also be included in the analytics server 102. The bus 1306 can communicatively couple one or more components of the analytics server 102.

The analytics server 102 can execute program code that configures the processor 1302 to perform one or more of the operations described above with respect to FIGS. 1-10. The program code can include, for example, the analytics tool 104. The program code may be resident in the memory 1304 or any suitable computer-readable medium and may be executed by the processor 1302 or any other suitable processor. In some embodiments, the object identifiers 106 and analytics data 110 can be resident in the memory 1304, as depicted in FIG. 13. In other embodiments, one or more of the object identifiers 106 and analytics data 110 can be resident in a memory that is accessible via a data network, such as a memory accessible to a cloud service.

The analytics server 102 can also include at least one network interface 1310. The network interface 1310 can include any device or group of devices suitable for establishing a wired or wireless data connection to one or more data networks 115. Non-limiting examples of the network interface 1310 include an Ethernet network adapter, a modem, and/or the like. The analytics server 102 can communicate with one or more content providers 116 and/or one of more client devices 118 using the network interface 1310.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system as a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system comprising:
a processing device;
a memory;
a display device; and
an analytics tool implemented on the processing device and configured to perform operations for tracking user interactions with a plurality of selectable objects in a content page having one or more regions defined by the content page as an organizational element, the operations comprising:
  determining, by a region module of the analytics tool, for each respective selectable object of the plurality of selectable objects, a region identifier corresponding to a region of the content page where the respective selectable object is located;
  determining, by a link module of the analytics tool, for each of the plurality of selectable objects, a link identifier;
  identifying, by the analytics tool, for each respective selectable object of the plurality of selectable objects, an object identifier comprising a concatenation of (i) a page identifier corresponding to the content page, (ii) the region identifier for the respective selectable object determined by the region module, and (iii) the link identifier for the respective selectable object determined by the link module, wherein the object identifier for the respective selectable object consistently identifies the respective selectable object;
  aggregating, by the analytics tool, measured analytics data as link activity for the plurality of selectable objects, the measured analytics data corresponding to tracked user interactions with the plurality of selectable objects over one or more periods of time;
  based on the link identifier and the region identifier that are concatenated with the page identifier, breaking the link activity into a portion of link activity for page regions and an additional portion of link activity for selectable objects; and
  displaying, by an activity map module of the analytics tool, on the display device, for respective ones of the plurality of selectable objects, a presentation of the link activity corresponding to a respective page identifier, a respective region identifier, and a respective link identifier for each of the plurality of selectable objects,
  wherein the presentation of the link activity corresponding to the respective link identifier is (i) sorted based on the respective region identifier for each of the plurality of selectable objects and (ii) displayed based on the portion of link activity for page regions and the additional portion of link activity for the selectable objects.

2. The system of claim 1, wherein:
the link activity comprises stored object identifiers for the plurality of selectable objects; and
the displaying comprises displaying, on a per-region basis for the respective ones of the plurality of selectable objects, the presentation of the link activity within a sorted list of link activity,
wherein the portion of the link activity and the additional portion of link activity include link rankings, link clicks, and object identifiers for the respective ones of the plurality of selectable objects, wherein per-region link activity is identified across a respective type of browser for each of the respective ones of the plurality of selectable objects.

3. The system of claim 1, the operations further comprising:
receiving input indicating a point in time along a time line, wherein the time line corresponds to the one or more periods of time; and
updating, for the respective ones of the plurality of selectable objects, displayed link activity to correspond to the point in time.

4. The system of claim 1, the operations further comprising:
displaying, within context of the content page, a respective overlay for each of the plurality of selectable objects; and
modifying, a visual characteristic of each respective overlay based on a positive or negative trend value of respective link activity for each respective selectable object of the plurality of selectable objects.

5. The system of claim 1, wherein the presentation of the link activity is displayed in a panel of a user interface that is displayed proximate to a display of the content page in the user interface without overlapping the display of the content page.

6. The system of claim 1, the operations further comprising storing, in the memory, the link activity for the plurality of selectable objects, wherein the storing comprises communicating with an analytics server to query the analytics server for a subset of analytics data corresponding to parameters describing the plurality of selectable objects and the one or more periods of time.

7. The system of claim 1, wherein the analytics tool is further configured to perform operations comprising:
accessing data describing the link activity corresponding to the respective page identifier,
wherein breaking the link activity into the portion of link activity and the additional portion of link activity includes breaking the accessed data into portions,
wherein the presentation of the link activity is further based on the portions of the accessed data.

8. The system of claim 1, wherein the presentation of the link activity includes presented link activity of multiple selectable objects within a global region that is identified by each respective region identifier for the multiple selectable objects,
wherein the presented link activity is presented for the global region for each of the multiple selectable objects.

9. A non-transitory computer-readable storage medium having executable instructions stored thereon, that, if executed by a processing device, cause the processing device to perform operations for tracking user interactions with a plurality of selectable objects in a content page having one or more regions, the instructions comprising:
determining, for each respective selectable object of the plurality of selectable objects, a region identifier corresponding to a region of the content page where the respective selectable object is located, wherein each of the one or more regions is defined by the content page as an organizational element;
determining, for each of the plurality of selectable objects, a link identifier;
identifying, for each respective selectable object of the plurality of selectable objects, an object identifier comprising a concatenation of (i) a page identifier corresponding to the content page, (ii) the determined region identifier for the respective selectable object, and (iii) the determined link identifier for the respective selectable object, wherein the object identifier for the respective selectable object consistently identifies the respective selectable object;
aggregating measured analytics data as link activity for the plurality of selectable objects, the measured analytics data corresponding to tracked user interactions with the plurality of selectable objects over one or more periods of time;
based on the link identifier and the region identifier that are concatenated with the page identifier, breaking the link activity into a portion of link activity for page regions and an additional portion of link activity for selectable objects; and
displaying, for respective ones of the plurality of selectable objects, a presentation of the link activity corresponding to a respective page identifier, a respective region identifier, and a respective link identifier for each of the plurality of selectable objects,
wherein the presentation of the link activity corresponding to the respective link identifier is (i) sorted based on the respective region identifier for each of the plurality of selectable objects and (ii) displayed based on the portion of link activity for page regions and the additional portion of link activity for the selectable objects.

10. The non-transitory computer-readable storage medium of claim 9, wherein the displaying comprises the presentation of the link activity within a context of the content page by displaying, for each of the respective ones of the plurality of selectable objects, the presentation of the link activity within an overlay proximate to the respective selectable object in the content page.

11. The non-transitory computer-readable storage medium of claim 9, wherein the displaying comprises, on a per-region basis for each of the plurality of selectable objects, the presentation of the link activity within a sorted list of link activity,
wherein the portion of the link activity and the additional portion of link activity include link rankings, link clicks, and object identifiers for each of the plurality of selectable objects,
wherein per-region link activity is identified across a respective type of browser for each of the respective ones of the plurality of selectable objects.

12. The non-transitory computer-readable storage medium of claim 9, the instructions further comprising:
displaying, within context of the content page, a respective overlay for each of the plurality of selectable objects; and
modifying, a visual characteristic of each respective overlay based on a positive or negative trend value of respective link activity for each respective selectable object of the plurality of selectable objects.

13. The non-transitory computer-readable storage medium of claim 9, wherein the displaying comprises the presentation of the link activity for the respective ones of the selectable objects in a panel of a user interface that is proximate to a display of the content page.

14. A computer implemented method for identifying selectable objects, the method comprising operations performed by one or more computing devices, the operations comprising:
analyzing a content page comprising a plurality of selectable objects and further comprising one or more regions defined by the content page as an organizational element;

determining, based on the analyzing,
- (i) a page identifier for the content page,
- (ii) one or more region identifiers for the one or more regions within the content page, wherein each region identifier denotes a parent organizational element of a respective region of the content page where a respective selectable object of the plurality of selectable objects is located, and
- (iii) a link identifier for each respective selectable object of the plurality of selectable objects; and generating, for each respective selectable object of the plurality of selectable objects, a unique object identifier comprising a concatenation of the page identifier, the region identifier, and the link identifier, wherein the unique object identifier for each respective selectable object consistently identifies the respective selectable object;

aggregating measured analytics data corresponding to tracked user interactions with the plurality of selectable objects;

storing the aggregated measured analytics data as link activity for the plurality of selectable objects;

accessing data describing the link activity corresponding to a respective page identifier for each of the plurality of selectable objects;

based on the link identifier and the region identifier that are concatenated with the page identifier, breaking the accessed data into a portion of link activity for page regions and an additional portion of link activity for selectable objects; and displaying, by an activity map module, for respective ones of the plurality of selectable objects, a presentation of the link activity corresponding to the respective page identifier, a respective region identifier, and a respective link identifier for each of the plurality of selectable objects, wherein the presentation of the corresponding link activity is (i) sorted based on the respective region identifier for each of the plurality of selectable objects and (ii) displayed based on the portion of link activity for page regions and the additional portion of link activity for the selectable objects.

15. The method of claim 14, wherein the unique object identifier for each respective selectable object is a string that consistently identifies the respective selectable object.

16. The method of claim 14, wherein the page identifier includes a web page name or URL corresponding to the content page.

17. The method of claim 14, wherein the region identifier is a logical name identifying a defined HTML region of the content page.

18. The method of claim 14, wherein the region identifier for each respective selectable object indicates that the respective selectable object is located in one of a header region, a main region, a global banner region, or a footer region of the content page.

19. The method of claim 14, wherein the link identifier is a logical name identifying a clickable HTML object in the content page.

20. The method of claim 14, further comprising transmitting the unique object identifier for each respective selectable object of the plurality of selectable objects to an analytics server configured to collect tracked analytics data corresponding to the plurality of selectable objects.

* * * * *